US008098406B2

(12) United States Patent  (10) Patent No.: US 8,098,406 B2
Hirota et al.  (45) Date of Patent: Jan. 17, 2012

(54) IMAGE FORMING APPARATUS CAPABLE OF SUPPRESSING COLOR VARIATION DUE TO MISREGISTRATION OF COLORS, IMAGE FORMING METHOD, AND COMPUTER-READABLE MEDIUM

(75) Inventors: Soh Hirota, Hoi-gun (JP); Osamu Yamada, Toyokawa (JP); Toshio Tsuboi, Okazaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1008 days.

(21) Appl. No.: 12/071,042

(22) Filed: Feb. 14, 2008

(65) Prior Publication Data

US 2009/0091796 A1 Apr. 9, 2009

(30) Foreign Application Priority Data

Oct. 9, 2007 (JP) ................................. 2007-263314

(51) Int. Cl.
H04N 1/405 (2006.01)
(52) U.S. Cl. ........................ 358/3.2; 358/3.13; 358/3.24
(58) Field of Classification Search .................... 358/1.9, 358/2.1, 3.13–3.2, 3.24, 500, 504, 527
See application file for complete search history.

(56) References Cited

U.S. PATENT DOCUMENTS

| 4,809,063 | A | 2/1989 | Moriguchi et al. |
| 4,814,797 | A | 3/1989 | Haneda et al. |
| 5,107,331 | A | 4/1992 | Collell et al. |
| 5,548,407 | A | 8/1996 | Von Kienlin et al. |
| 6,188,491 | B1 | 2/2001 | Nagashima |
| 6,204,930 | B1 | 3/2001 | Inoue |
| 2002/0158931 | A1 | 10/2002 | Cooper |

FOREIGN PATENT DOCUMENTS

| DE | 36 10 465 | 3/1994 |
| EP | 0 503 645 | 9/1992 |
| EP | 0 734 149 | 9/1996 |
| EP | 0 813 335 | 12/1997 |
| JP | 60-101051 | 6/1985 |

(Continued)

OTHER PUBLICATIONS

Notice of Grounds of Rejection issued in the corresponding Japanese Patent Application No. 2007-263314 dated Jan. 26, 2010, and an English Translation thereof.

(Continued)

Primary Examiner — Thomas D Lee
Assistant Examiner — Stephen M Brinich
(74) Attorney, Agent, or Firm — Buchanan Ingersoll & Rooney PC

(57) ABSTRACT

An image forming apparatus performs dither processing on image data to form an image subjected to pseudo-halftone processing. The image forming apparatus includes a dither processing unit that performs dither processing on image data, and a dither pattern generation unit that generates a dither matrix for use in the dither processing, in accordance with an output gradation level. The dither matrix has a size of M×N pixels, and has a plurality of halftone dots arranged in a predetermined pattern in accordance with the output gradation level in order to represent a gradation of each color. The plurality of halftone dots are arranged in the dither matrix such that the halftone dots corresponding to at least two colors are substantially identical in color area ratio to each other in the dither matrix irrespective of a relative position with respective to the colors.

17 Claims, 46 Drawing Sheets
(44 of 46 Drawing Sheet(s) Filed in Color)

FOREIGN PATENT DOCUMENTS

| | | |
|---|---|---|
| JP | 62-91076 A | 4/1987 |
| JP | 08-139947 | 5/1996 |
| JP | 09-331452 | 12/1997 |
| JP | 11-027552 | 1/1999 |
| JP | 2001-111832 | 4/2001 |
| JP | 2001-341356 A | 12/2001 |
| JP | 2002-118746 | 4/2002 |
| JP | 2005-203871 | 7/2005 |
| JP | 2006-248096 | 9/2006 |
| JP | 2007-253602 | 10/2007 |
| WO | WO 2007/102356 | 9/2007 |

OTHER PUBLICATIONS

Notice of Grounds of Rejection issued in corresponding Application No. 2007-263314 dated Oct. 20, 2009, and an English Translation thereof.

European Search Report in corresponds application No. 08002714.7-1522 dated Jan. 20, 2009.

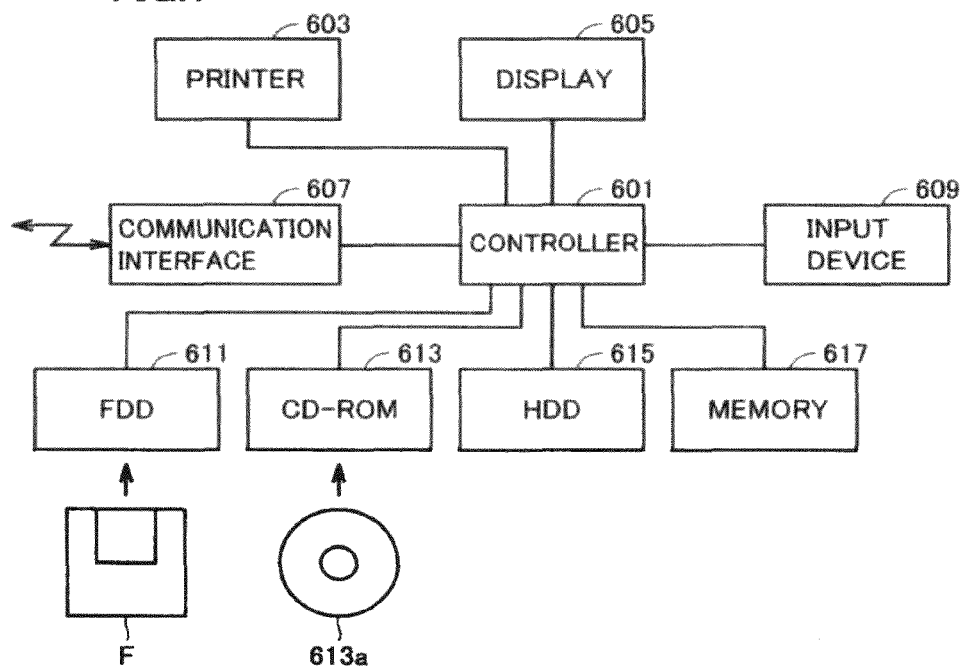
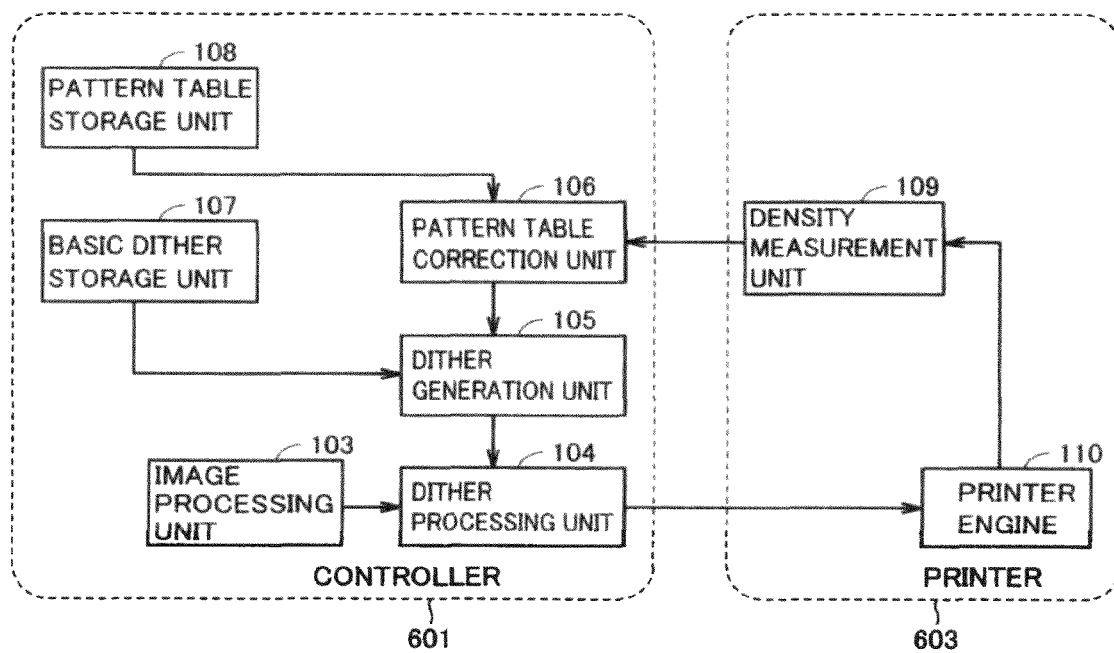

[CYAN]

[CYAN]

[RELATIVE POSITION WITH RESPECT TO CYAN AND MAGENTA: +1-PIXEL]

[CYAN]

[CYAN]

[RELATIVE POSITION WITH RESPECT TO CYAN AND MAGENTA: -1-PIXEL]

[CYAN]

IMAGE FORMING APPARATUS CAPABLE OF SUPPRESSING COLOR VARIATION DUE TO MISREGISTRATION OF COLORS, IMAGE FORMING METHOD, AND COMPUTER-READABLE MEDIUM

This application is based on Japanese Patent Application No. 2007-263314 filed with the Japan Patent Office on Oct. 9, 2007, the entire content of which is hereby incorporated by reference.

BACKGROUND OF THE INVENTION

1. Field of the Invention

The present invention relates to an image forming apparatus. In particular, the present invention relates to an image forming apparatus and an image forming method each used for performing dither processing on image data to form an image subjected to pseudo-halftone processing.

2. Description of the Related Art

An image forming apparatus adopting electrophotography, such as a laser printer, carries out printing through processes including exposure, development, transfer and fixation.

In an exposure step, first, an electrostatic latent image of an image is formed on a surface of a photosensitive drum by irradiation with an exposure beam changed in amount on the basis of image data to be printed out. Herein, a gray scale of the image, that is, a gradation can be represented by intensity modulation of the exposure beam or control of an exposure time.

In a development step, next, toner is attached to the photosensitive drum, so that the electrostatic latent image is developed as a toner image on the photosensitive drum. In a transfer step, the toner image is primary-transferred from the photosensitive drum to a transfer belt, and then is secondary-transferred from the transfer belt to a sheet of paper for printing. In a fixation step, heat is applied to the sheet of paper, so that the toner image is fixated on the sheet of paper.

A color printer that uses multicolor toner requires an exposure unit and a development unit for each color. In this color printer, toner images of the respective colors are superposed on a transfer member such as a transfer belt, and then are transferred collectively to a sheet of paper for printing. This color printer is known as a so-called tandem color printer.

The foregoing image forming apparatus adopting photography has the following problem. That is, since the toner images of the respective colors are superposed on the transfer member, respectively, misregistration of the colors degrades image quality.

Upon printing of a uniform halftone image, for example, if misregistration of colors occurs partially, a portion where the misregistration occurs is different in color from the remaining portion in development. In other words, there is a possibility that color shading may occur in a page.

Further, if misregistration of colors in one page is different in degree from that in another page, there is a possibility that color variation may occur between the pages.

The color variation occurs due to different degrees of color misregistration, so that pitch nonuniformity occurs disadvantageously. Accordingly, such a disadvantage must be prevented.

For example, Japanese Laid-Open Patent Publication No. 62-091076 proposes a technique of growing a line screen in a sub scanning direction in order to eliminate pitch nonuniformity as much as possible. Alternatively, Japanese Laid-Open Patent Publication No. 2001-341356 proposes a technique of setting a size of a matrix at a value other than an integral multiple of beams in order to eliminate pitch nonuniformity due to multibeam irradiation as much as possible.

However, each of the foregoing methods fails to suppress color variation due to misregistration of colors.

SUMMARY OF THE INVENTION

The present invention has been devised to solve the foregoing problems. An object of the present invention is to provide an image forming apparatus and an image forming method each capable of suppressing color variation due to misregistration of colors.

The present invention provides an image forming apparatus for performing dither processing on image data to form an image subjected to pseudo-halftone processing. The image forming apparatus includes: a dither processing unit that performs dither processing on image data; and a dither pattern generation unit that generates a dither matrix for use in the dither processing, in accordance with an output gradation level. The dither matrix has a size of M×N pixels, and has a plurality of halftone dots arranged in a predetermined pattern in accordance with the output gradation level in order to represent a gradation of each color. The plurality of halftone dots are arranged in the dither matrix such that the halftone dots corresponding to at least two colors are substantially identical in color area ratio to each other in the dither matrix irrespective of a relative position with respective to the colors.

Preferably, the dither matrix includes basic patterns each having pixels equal in number to the pixels arranged in one of sides of the dither matrix, and the basic patterns coming into contact with each other in a vertical direction are displaced mutually in a lateral direction.

Preferably, the number of pixels arranged in one of sides of the dither matrix is an odd number.

Preferably, the M×N pixels are not less than four times as large in number as output gradations.

Preferably, the image forming apparatus further includes: a density measurement unit that measures a density of an actual image formed by a printer engine; a reference dither storage unit that stores a referential dither matrix; a pattern table storage unit that stores a pattern table for specifying halftone dot arrangement in the referential dither matrix brought into correspondence with the output gradation level; and a pattern table correction unit that corrects the pattern table stored in the pattern table storage unit, on the basis of a result of the measurement by the density measurement unit. Herein, the dither pattern generation unit generates the dither matrix on the basis of an output result of the pattern table for specifying the halftone dot arrangement in the referential dither matrix from the pattern table correction unit in accordance with the output gradation level.

The present invention also provides an image forming method for performing dither processing on image data to form an image subjected to pseudo-halftone processing. The image forming method includes the steps of: performing dither processing on image data; and generating a dither matrix for use in the dither processing in accordance with an output gradation level. Herein, in the step of generating the dither matrix, the dither matrix has a size of M×N pixels, and has a plurality of halftone dots arranged in a predetermined pattern in accordance with the output gradation level in order to represent a gradation of each color, and the plurality of halftone dots are arranged in the dither matrix such that the halftone dots corresponding to at least two colors are substantially identical in color area ratio to each other in the dither matrix irrespective of a relative position with respective to the colors.

Preferably, the dither matrix includes basic patterns each having pixels equal in number to the pixels arranged in one of sides of the dither matrix, and the basic patterns coming into contact with each other in a vertical direction are displaced mutually in a lateral direction.

Preferably, the number of pixels arranged in one of sides of the dither matrix is an odd number.

Preferably, the M×N pixels are not less than four times as large in number as output gradations.

The present invention also provides a computer-readable medium for storing a control program causing an image forming apparatus that performs dither processing on image data to form an image subjected to pseudo-halftone processing to execute the steps of: performing dither processing on image data; and generating a dither matrix for use in the dither processing in accordance with an output gradation level. Herein, in the step of generating the dither matrix, the dither matrix has a size of M×N pixels, and has a plurality of halftone dots arranged in a predetermined pattern in accordance with the output gradation level in order to represent a gradation of each color, and the plurality of halftone dots are arranged in the dither matrix such that the halftone dots corresponding to at least two colors are substantially identical in color area ratio to each other in the dither matrix irrespective of a relative position with respective to the colors.

Preferably, the dither matrix includes basic patterns each having pixels equal in number to the pixels arranged in one of sides of the dither matrix, and the basic patterns coming into contact with each other in a vertical direction are displaced mutually in a lateral direction.

Preferably, the number of pixels arranged in one of sides of the dither matrix is an odd number.

Preferably, the M×N pixels are not less than four times as large in number as output gradations.

In the image forming apparatus and the image forming method according to the present invention, the dither matrix has the size of M×N pixels, and has the plurality of halftone dots arranged in the predetermined pattern in accordance with the output gradation level in order to represent the gradation of each color. Further, the plurality of halftone dots are arranged in the dither matrix such that the halftone dots corresponding to at least two colors are substantially identical in color area ratio to each other in the dither matrix irrespective of the relative position with respective to the colors. Unlike the conventional art, therefore, the present invention allows suppression of color variation even in a case where misregistration of colors, that is, misalignment of resist patterns occurs.

The foregoing and other objects, features, aspects and advantages of the present invention will become more apparent from the following detailed description of the present invention when taken in conjunction with the accompanying drawings.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIG. 1 shows a schematic configuration of an image forming apparatus that performs image processing according to one embodiment of the present invention.

FIG. 2A is a functional block diagram showing a controller and a printer each performing the image processing according to the embodiment of the present invention.

DESCRIPTION OF THE PREFERRED EMBODIMENTS

Figure 2B:
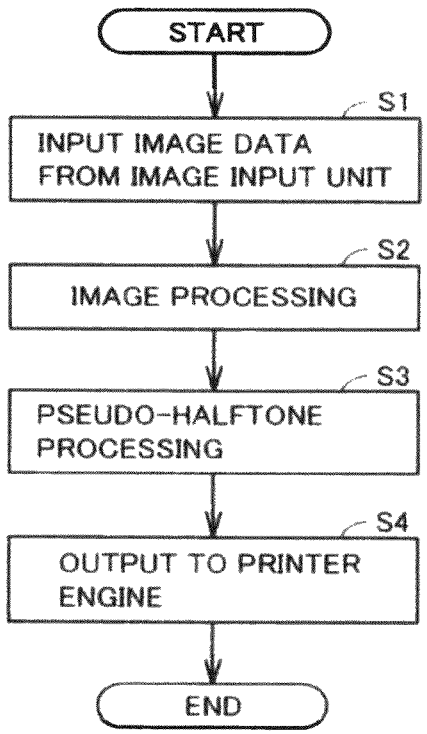
FIG. 2B is a flowchart illustrating a flow of the image processing by the controller illustrated in FIG. 2A.

With reference to the drawings, hereinafter, description will be given of preferred embodiments of the present invention. In the drawings, identical components and constituent elements are denoted by identical reference numerals, and designations and functions thereof are equal to each other, respectively.

In one embodiment of the present invention, description will be given of a case where an image forming apparatus according to the present invention is a digital color copying machine (hereinafter, simply referred to as a copying machine).

However, the example of the image forming apparatus according to the present invention is not limited to a copying machine. Alternatively, the image forming apparatus according to the present invention may be a printer, a facsimile, an MFP (Multi Function Peripheral) functioning as a printer and a facsimile, or the like.

With reference to FIG. 1, description will be given of a schematic configuration of image forming apparatus 1 that performs image processing according to the embodiment of the present invention.

As shown in FIG. 1, the image forming apparatus according to the embodiment of the present invention includes a controller 601, a display 605, a printer 603, an input device 609, a communication interface 607, an FDD drive 611, a CD-ROM drive 613, an HDD drive 615 and a memory 617. Memory 617 is typically a volatile storage device such as a DRAM (Dynamic Random Access Memory), and retains data required for execution of a program.

Controller 601 receives a command from a user through input device 609, and outputs to display 605 a screen output generated by execution of a program. Communication interface 607 typically transmits and receives data to and from a personal computer and the like through a network, and includes a LAN adaptor, driver software for control of the LAN adaptor, and the like. Printer 603 performs print processing with the use of a printer engine, and has a hardware configuration for the print processing. Printer 603 also includes a control unit for control of operations of respective units. Input device 609 includes an image input unit such as a scanner (not shown).

HDD drive 615 stores a program required for execution of the program in controller 601, in a nonvolatile manner. FDD drive 611 or CD-ROM drive 613 reads such a program from a flexible disc F or a CD-ROM (Compact Disc-Read Only Memory) 613a.

With reference to FIG. 2A, description will be given of functional blocks of controller 601 and printer 603 each performing the image processing according to the embodiment of the present invention.

As shown in FIG. 2A, it is assumed herein that respective units in controller 601 are realized by loading of an image processing program stored previously in, for example, HDD drive 615.

Specifically, controller 601 includes an image processing unit 103, a dither processing unit 104, a basic dither storage unit 107, a pattern table storage unit 108, a pattern table correction unit 106 and a dither generation unit 105. Herein, basic dither storage unit 107 stores a basic dither pattern that has a size of M×N pixels and represents (M×N+1) gradation levels. Pattern table storage unit 108 stores a pattern table in which the gradation levels in the basic dither pattern are brought into correspondence with, for example, 256 gradations, respectively. Pattern table correction unit 106 corrects the pattern table in accordance with a temporal change of output characteristics of the printer. Dither generation unit 105 generates dither patterns corresponding to the 256 gradations with the use of the pattern table corrected by pattern table correction unit 106 and the basic dither pattern stored in basic dither storage unit 107.

Image data is inputted to controller 601 through the image input unit of input device 609 shown in FIG. 1, is subjected to appropriate image processing in image processing unit 103 of controller 601, and is converted into multivalued CMYK data. Then, the CMYK data is sent to dither processing unit 104.

Dither processing unit 104 performs pseudo-halftone processing with the use of the dither pattern (also referred to as a dither matrix) generated by dither generation unit 105 to produce a bit image. Printer engine 110 of printer 603 receives the bit image to form an actual image. It is assumed herein that printer 603 is a laser beam printer.

Printer 603 includes a density measurement unit 109 that measures an actual density of the image formed by printer engine 110. Pattern table correction unit 106 receives a signal from density measurement unit 109 to correct the pattern table outputted from pattern table storage unit 108.

As described above, dither generation unit 105 generates the dither matrix on the basis of the basic dither pattern stored in basic dither storage unit 107 and the corrected pattern table.

With reference to FIG. 2B, description will be given of a flow of the image processing by controller 601 illustrated in FIG. 2A.

First, image data is input from the image input unit of input device 609 (step S1).

Then, on the input image data, the above-described image processing is performed by image processing unit 103 (step S2).

Next, on the image data that is output from image processing unit 103, the pseudo-halftone processing is performed by dither processing unit 104 using a dither matrix generated by dither generation unit 105 to produce a bit image (step S3).

Then, the produced bit image is output to printer engine 110 (step S4).

Figure 2C:
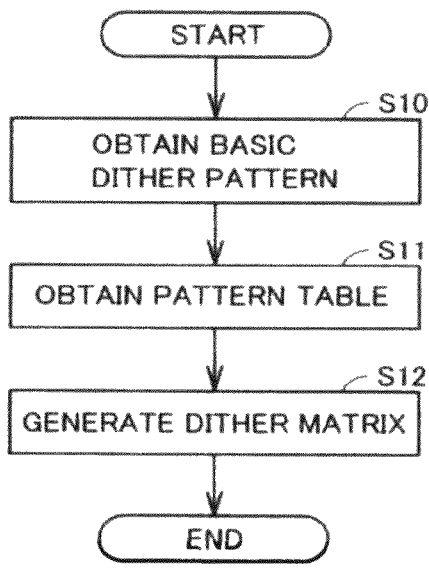
FIG. 2C illustrates generation of a dither matrix by the controller illustrated in FIG. 2A.

With reference to FIG. 2C, description will be given of the generation of the dither matrix by controller 601 illustrated in FIG. 2A.

Dither generation unit 105 receives a basic dither pattern from basic dither storage unit 107 (step S10). Specifically, the basic dither pattern is obtained that has a size of M×N pixels and can represent (M×N+1) gradation levels. As one example, a basic dither pattern of 37×37 pixels that can represent 256 gradation levels is obtained.

Then, a pattern table is obtained from pattern table storage unit 108 (step S11). Specifically, the pattern table corrected by pattern table correction unit 106 as described above is obtained. As one example, a corrected pattern table is obtained in which respective 256 gradation levels and the corresponding gradation levels of the basic dither pattern are correlated with each other.

Then, based on the basic dither pattern and the corrected pattern table, a dither matrix is generated (step S12). As one example, a dither matrix having gradations corresponding respectively to 256 gradations is generated using the basic dither pattern of 37×37 pixels.

The dither matrix generated as described above is used by dither processing unit 104.

Figure 3:
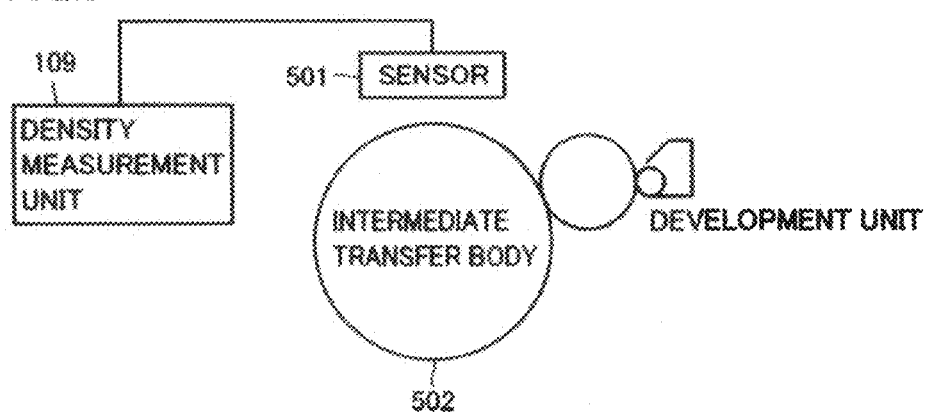
FIG. 3 shows a schematic configuration of the printer.

FIG. 3 illustrates a schematic configuration of printer 603.

With reference to FIG. 3, printer 603 has a development unit in printer engine 110 that forms an image on an intermediate transfer body 502.

Herein, an output density value varies due to influences (such as temperature and humidity) in a use environment, so that a desired output gradation which is coincident with an input density value can not be obtained in some cases.

In order to avoid this drawback, a pattern table is corrected at a predetermined timing (e.g., after power-on) to maintain a stable gradation property constantly.

Specifically, a corrective image that has a gradation pattern consisting of a plurality of gradations, that is, a plurality of patch-like density steps with density varying in a stepwise manner is formed on intermediate transfer body 502. Then, density measurement unit 109 detects an output density of the corrective image transferred on a transfer belt through a photosensitive drum in such a manner that an optical sensor 501 measures an amount of light reflected from intermediate transfer body 502. Then, pattern table correction unit 106 receives a result of the measurement to correct a gradation.

A method for correcting the gradation involves: plotting, as output density values, measured density values in the respective density steps, which are measured by sensor 501, with respect to input density values to calculate a measurement curve; obtaining a correction curve having a property opposite to that of the measurement curve with respect to a straight line indicating a target output gradation; and correcting the gradation on the basis of the correction curve.

The pattern table correction unit 106 corrects a pattern table so as to achieve a target gradation property in accordance with a density value measured by the foregoing gradation correction method.

Herein, description will be given of basic dither storage unit 107.

The basic dither pattern in basic dither storage unit 107 has the size of M×N pixels.

In the basic dither pattern, the M×N pixels light up in an order predetermined in accordance with a gradation level. A case where no pixels light up corresponds to 0 gradation, and a case where all the pixels light up corresponds to M×N gradations. That is, the dither matrix having the size of the M×N pixels can represent (M×N+1) gradations.

In a case where the number of gradations of image data is 256, gradations of a basic dither pattern must be brought into correspondence with the 256 gradations. A result of this correspondence is recorded in a pattern table stored in pattern table storage unit 108.

Herein, the gradations to be prepared herein must be larger in number than output gradations in order to maintain a stable gradation property constantly. Desirably, the number of gradations is not less than four times as large as the number of output gradations. In order to represent the 256 gradations, for example, the dither matrix to be prepared has pixels of M×N≧1024.

Figure 4:
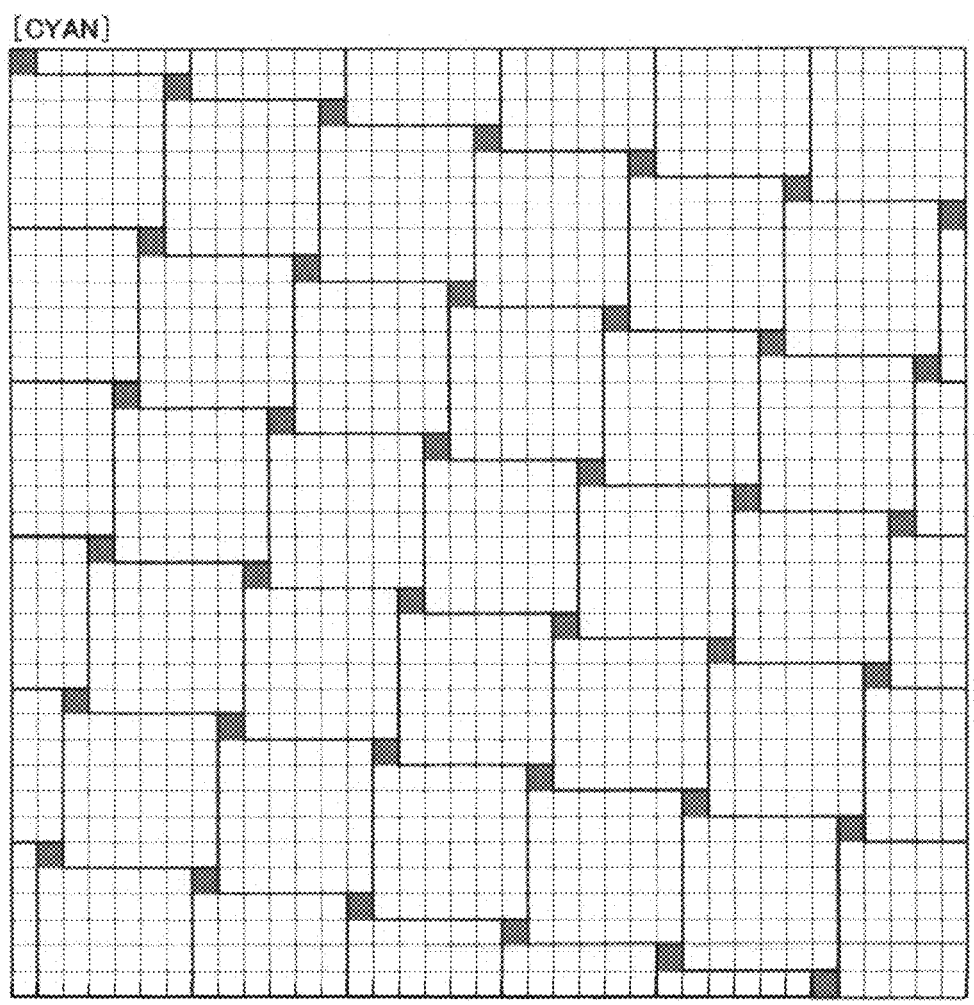
FIG. 4 shows a first specific example of a basic dither pattern (cyan) according to the embodiment of the present invention.

With reference to FIG. 4, description will be given of a first specific example of a basic dither pattern (cyan) according to the embodiment of the present invention.

Figure 5:
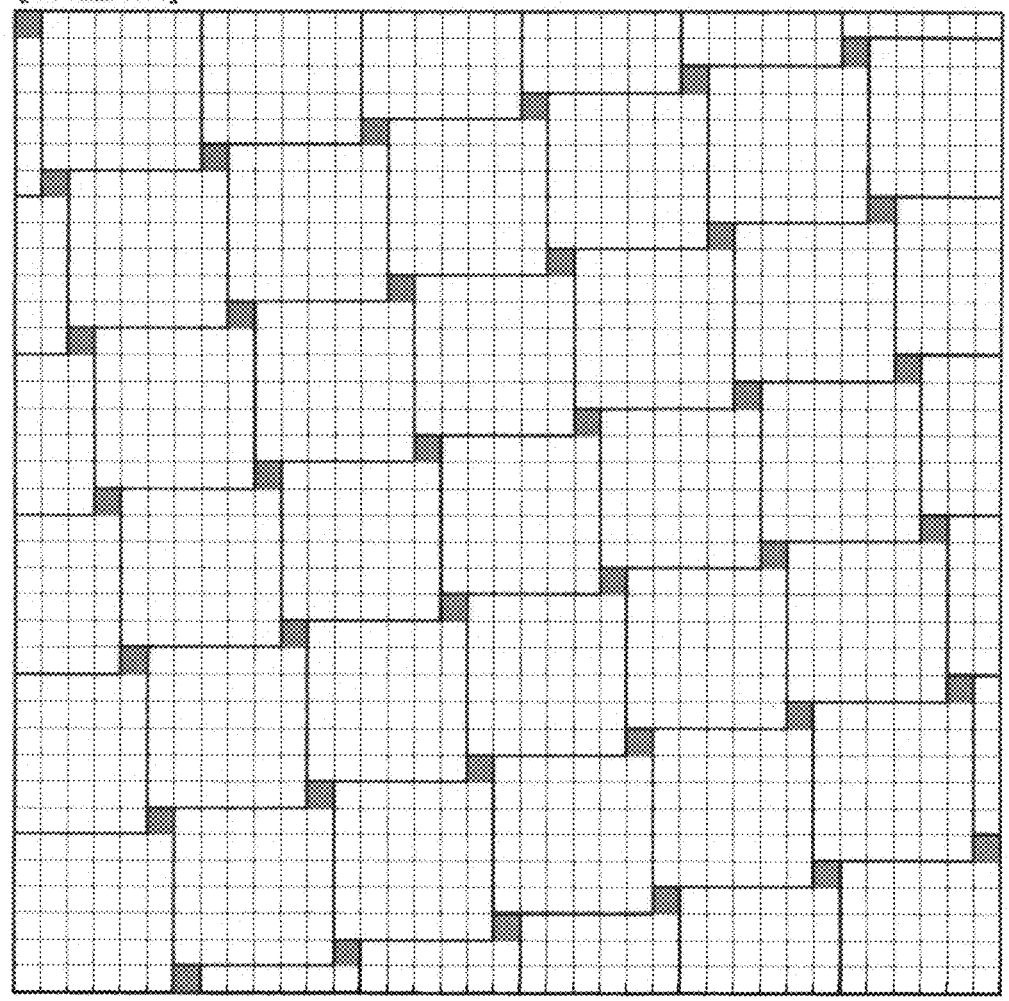
FIG. 5 shows a first specific example of a basic dither pattern (magenta) according to the embodiment of the present invention.

With reference to FIG. 5, description will be given of a first specific example of a basic dither pattern (magenta) according to the embodiment of the present invention.

As shown in FIGS. 4 and 5, each of the basic dither pattern (cyan) and the basic dither pattern (magenta) has a size of 37×37 pixels. In the first specific example, that is, the number of pixels arranged in one side of the basic dither pattern is an odd number.

The number of representable gradations is obtained from an equation, 37×37+1=1370. For the sake of simplification of the description, in the first specific example, the basic dither pattern is divided into 37 blocks as shown by bold lines. One block (6×6+1 pixels) is also referred to as a basic pattern. Basic patterns coming into contact with each other in a vertical direction are displaced mutually in a lateral direction. Thus, it is assumed herein that a region located at a leftmost position in a second column from above is connected with a region located at a rightmost position in the second column from above in the lateral direction to form one basic pattern (6×6+1 pixels). It is also assumed herein that a lowermost region is connected with an uppermost region in the vertical direction to form one basic pattern (6×6+1 pixels). The laterally displaced relation of the basic patterns in each of the basic dither pattern (cyan) and the basic dither pattern (magenta) is specular-symmetric with respect to the vertical direction.

In the basic dither pattern, as described above, the M×N (37×37) pixels light up in the order predetermined in accordance with the gradation level. Basically, this order is predetermined such that halftone dots in the basic pattern become bold gradually.

In a case where one pixel is 1200 dpi for image formation, the number of screen lines in the basic dither pattern is about 197 lpi.

Figure 6:
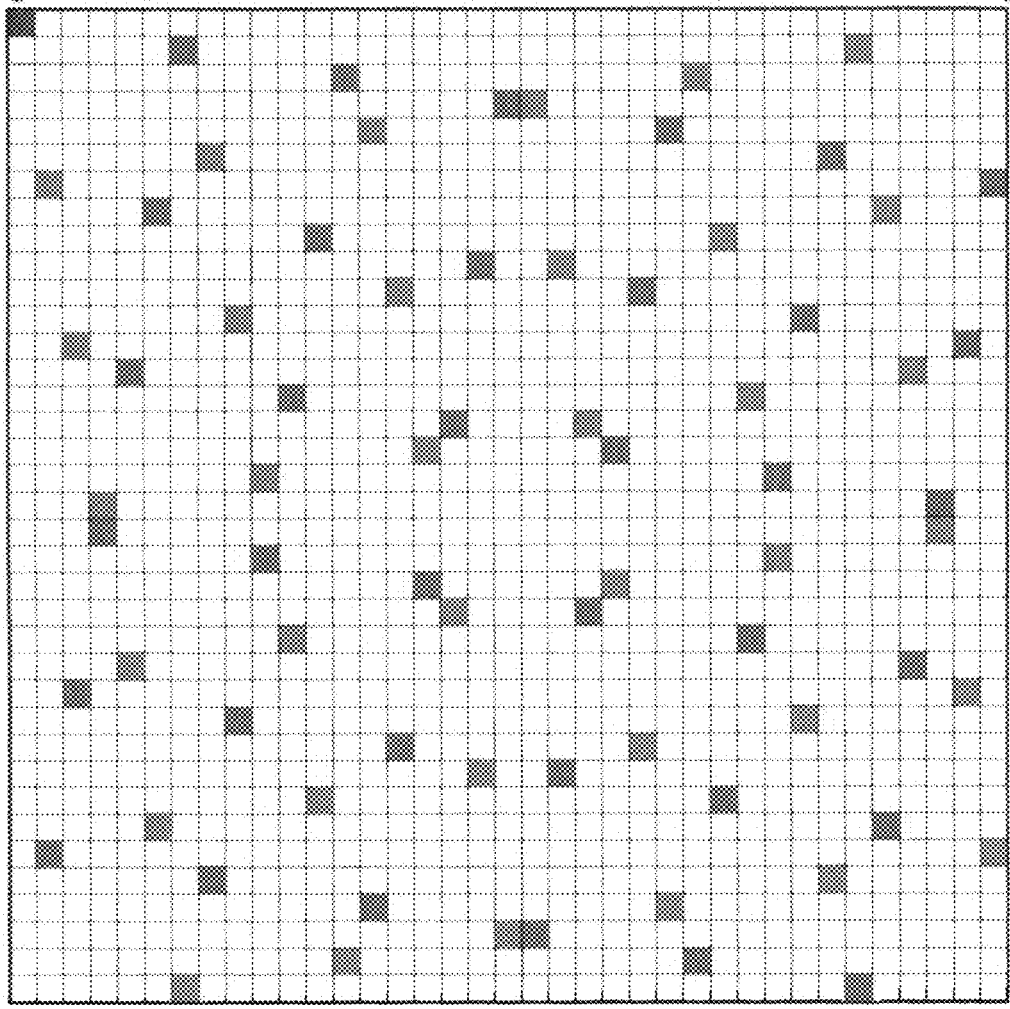
FIG. 6 shows a relative positional relation between the basic dither pattern (cyan) shown in FIG. 4 and the basic dither pattern (magenta) shown in FIG. 5 in a case where the two basic dither patterns are superposed without displacement.

With reference to FIG. 6, description will be given of a relative positional relation between the basic dither pattern (cyan) shown in FIG. 4 and the basic dither pattern (magenta) shown in FIG. 5 in a case where the two basic dither patterns are superposed without displacement (also referred to as a relative position of 0-pixel).

Figure 7:
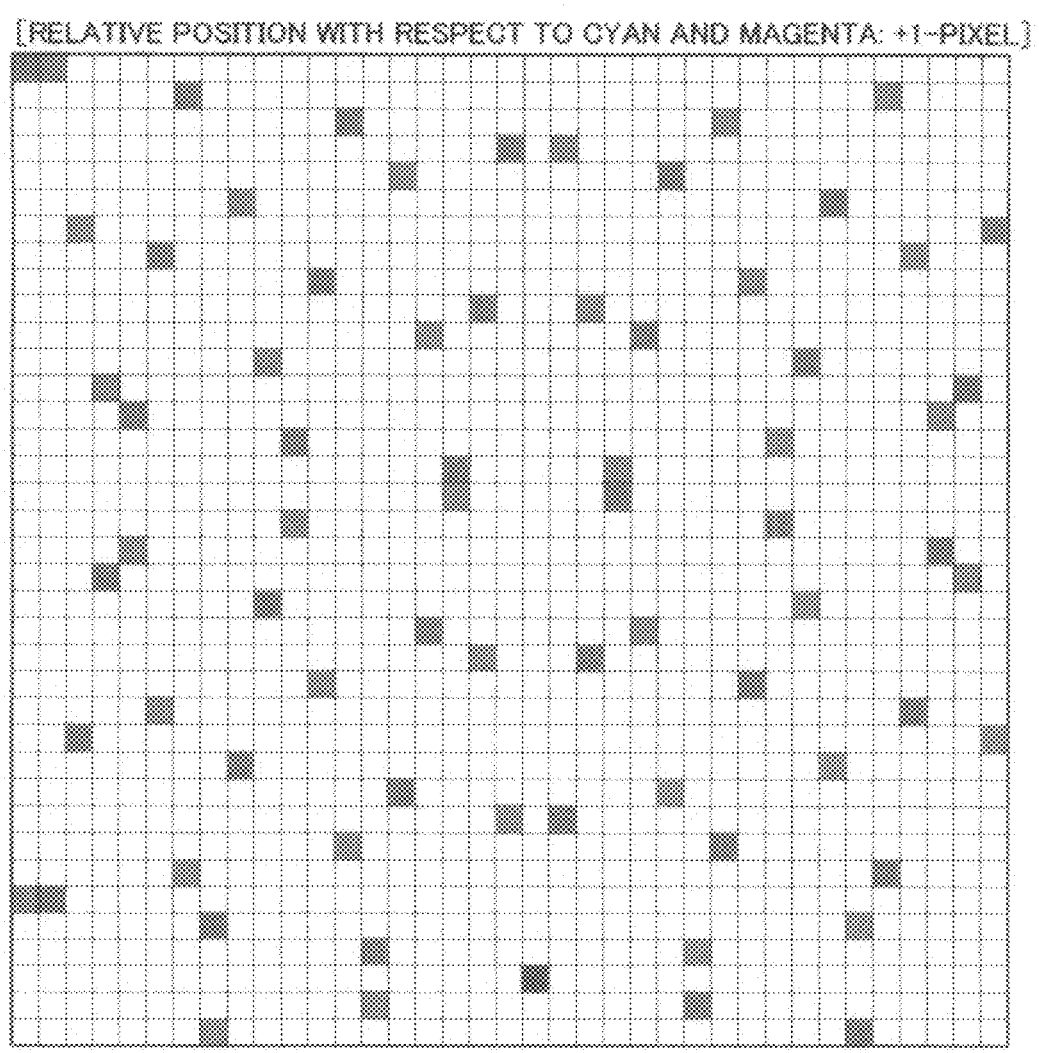
FIG. 7 shows a relative positional relation between the basic dither pattern (cyan) shown in FIG. 4 and the basic dither pattern (magenta) shown in FIG. 5 in a case where the two basic dither patterns are superposed with the basic dither pattern (magenta) displaced by one pixel in a positive direction.

With reference to FIG. 7, description will be given of a relative positional relation between the basic dither pattern (cyan) shown in FIG. 4 and the basic dither pattern (magenta) shown in FIG. 5 in a case where the two basic dither patterns are superposed with the basic dither pattern (magenta) displaced by one pixel in a positive direction (also referred to as a relative position of +1-pixel). As for a displacing direction of the basic dither pattern (magenta), in this embodiment, a right direction in the figure corresponds to a positive direction and a left direction in the figure corresponds to a negative direction.

Specifically, the basic dither pattern (magenta) is displaced by one pixel in the lateral direction.

Figure 8:
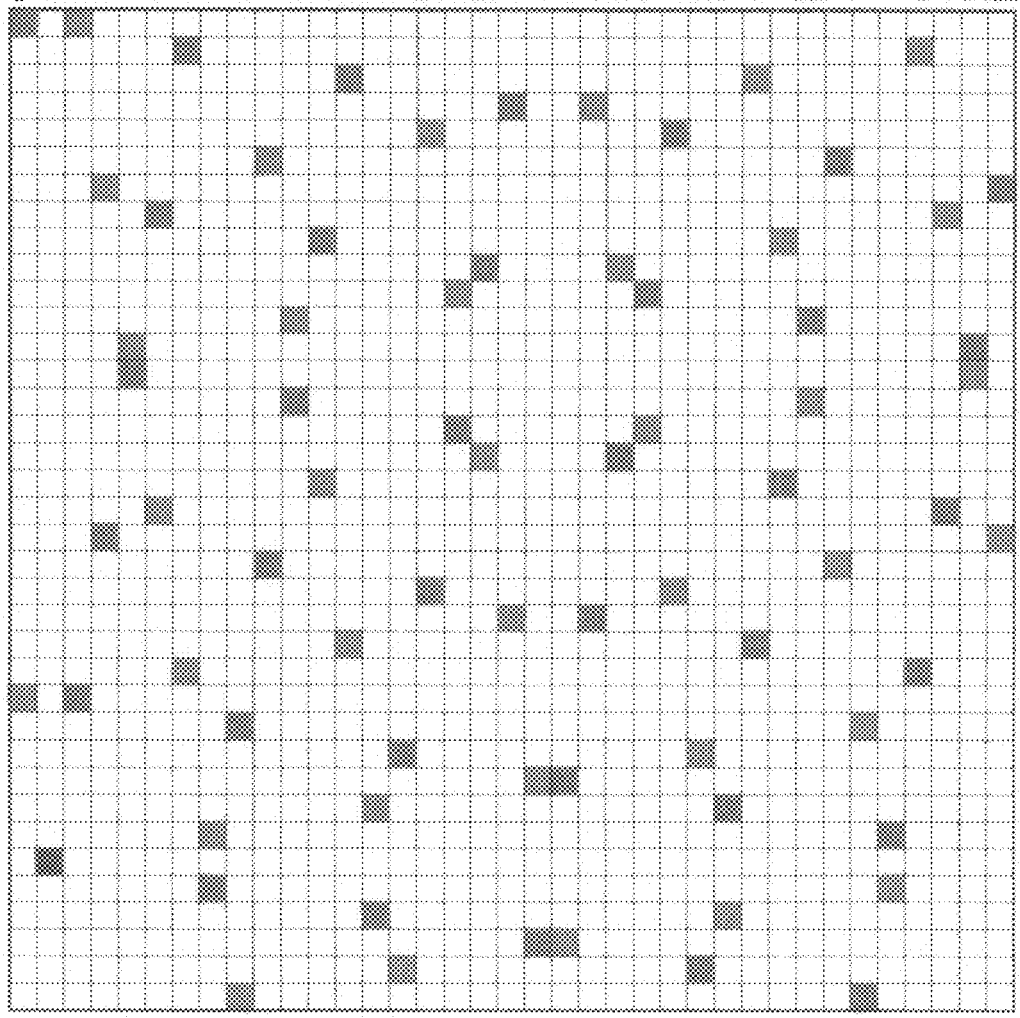
FIG. 8 shows a relative positional relation between the basic dither pattern (cyan) shown in FIG. 4 and the basic dither pattern (magenta) shown in FIG. 5 in a case where the two basic dither patterns are superposed with the basic dither pattern (magenta) displaced by two pixels in the positive direction.

With reference to FIG. 8, description will be given of a relative positional relation between the basic dither pattern (cyan) shown in FIG. 4 and the basic dither pattern (magenta) shown in FIG. 5 in a case where the two basic dither patterns are superposed with the basic dither pattern (magenta) displaced by two pixels in the positive direction (also referred to as a relative position of +2-pixel).

A halftone dot that forms a basic dither pattern has a size of 1×1 pixel in a basic pattern. As shown in FIGS. 6 to 8, when the basic dither pattern (magenta) is displaced, a position of a pixel (blue) generated by superposition of pixels (cyan and magenta) is also changed.

Table 1 lists an area ratio of each color in a case where the basic dither pattern (magenta) is displaced by one pixel in the lateral direction.

TABLE 1

|  | 0-Pixel | +1-Pixel | +2-Pixel |
|---|---|---|---|
| Cyan | 2.6% | 2.6% | 2.6% |
| Magenta | 2.6% | 2.6% | 2.6% |
| Blue | 0.1% | 0.1% | 0.1% |
| White | 94.7% | 94.7% | 94.7% |

In the first specific example of the basic dither pattern according to the embodiment of the present invention, as listed in Table 1, the area ratio of each color on a 37×37-matrix basis has no change in the case where the basic dither pattern (magenta) is displaced by one pixel in the lateral direction. In other words, halftone dots are arranged in the dither matrix such that the halftone dots corresponding to two colors are substantially identical in color area ratio to each other in the dither matrix irrespective of a relative position with respective to the colors.

Figure 9:
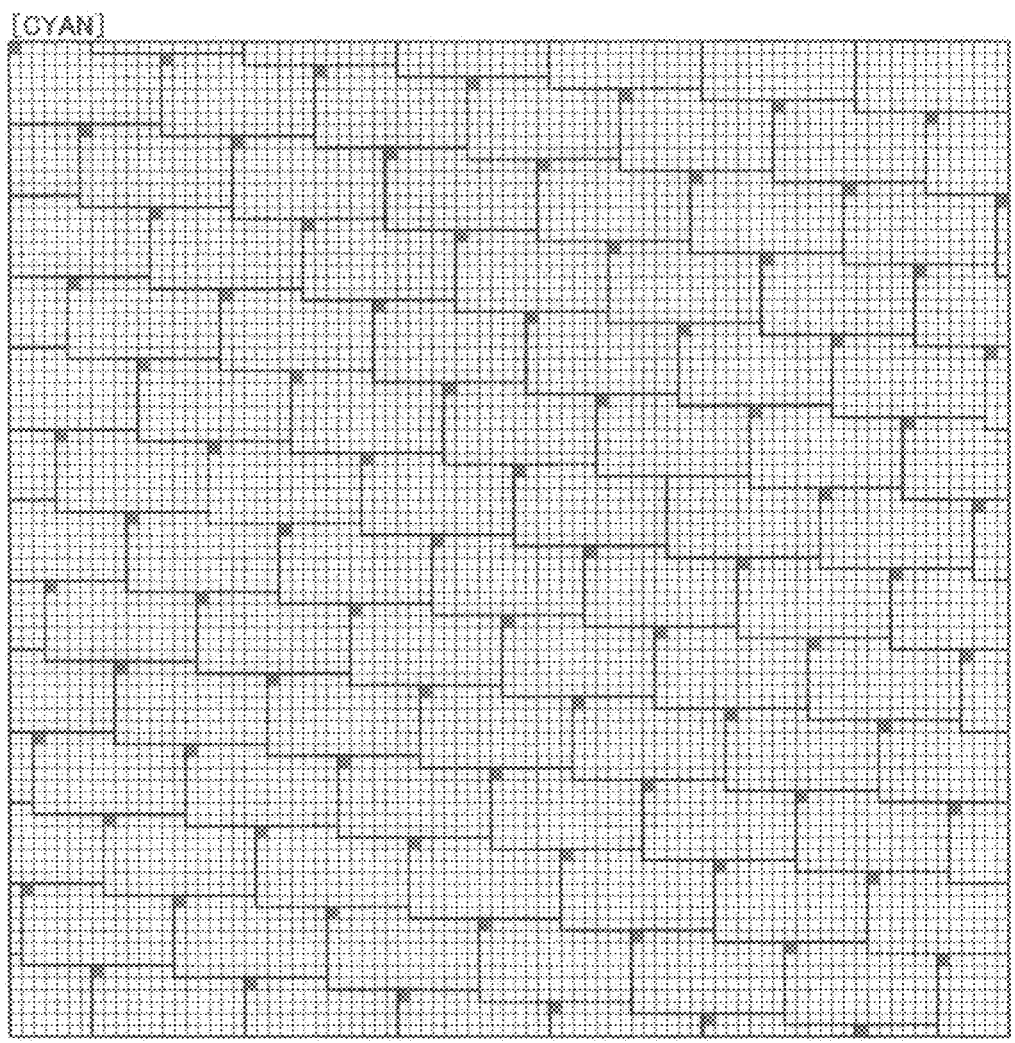
FIG. 9 shows a second specific example of the basic dither pattern (cyan) according to the embodiment of the present invention.

With reference to FIG. 9, description will be given of a second specific example of the basic dither pattern (cyan) according to the embodiment of the present invention.

Figure 10:
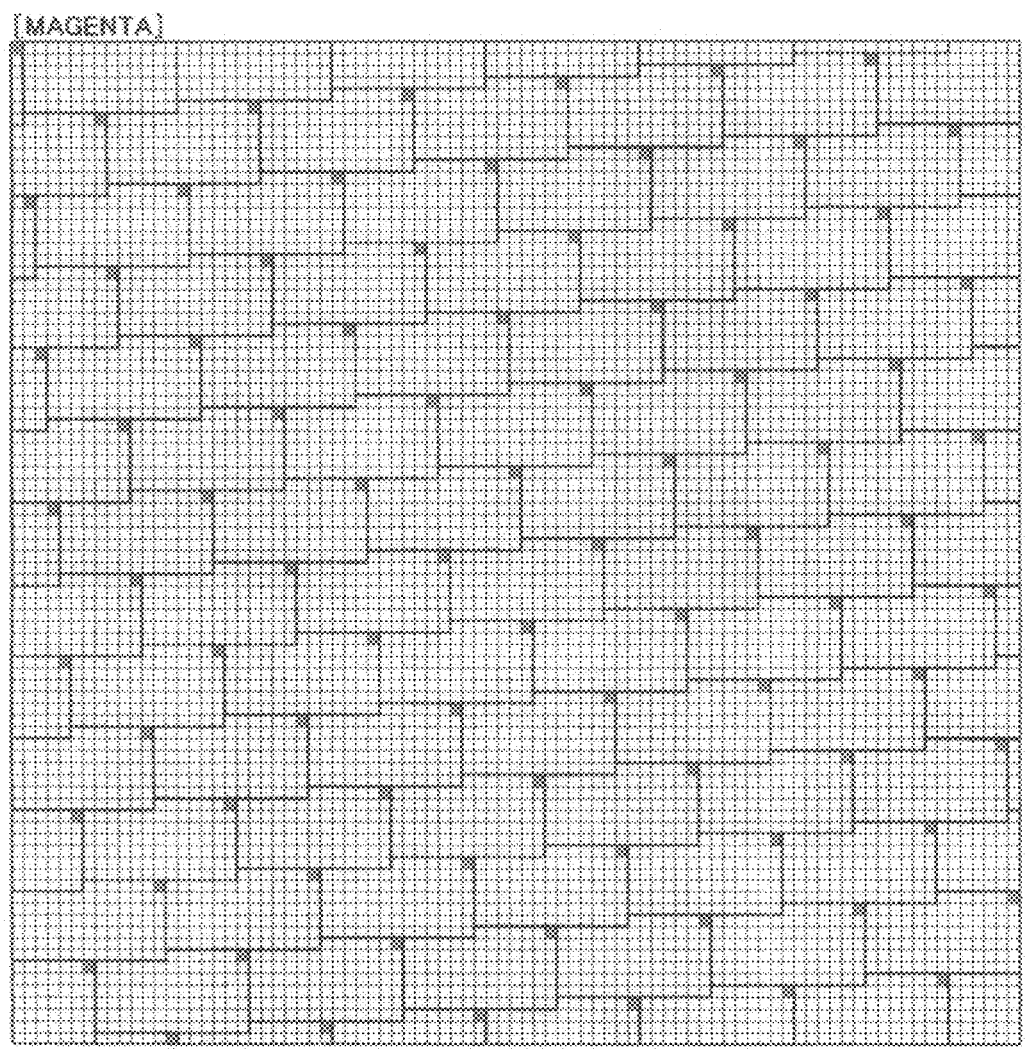
FIG. 10 shows a second specific example of the basic dither pattern (magenta) according to the embodiment of the present invention.

With reference to FIG. 10, description will be given of a second specific example of the basic dither pattern (magenta) according to the embodiment of the present invention.

As shown in FIGS. 9 and 10, herein, the basic dither pattern has a size of 85×85 pixels. Therefore, the number of representable gradations is obtained from an equation, 85×85+1=7226. Each halftone dot has a size of 1×1 pixel. Herein, 85 halftone dots are arranged in the basic dither pattern. For the sake of simplification of the description, in the second specific example, the basic dither pattern is divided into 85 blocks as shown by bold lines. One block corresponds to a region that includes a rectangular region having a size of 6 (vertical direction)×13 (lateral direction) pixels and seven pixels in the lateral direction (13×6+7=85 pixels), and is also referred to as a basic pattern. Herein, basic patterns coming into contact with each other in the vertical direction are displaced mutually in the lateral direction. Thus, it is assumed herein that a region located at a leftmost position in a second column from above is connected with a region located at a rightmost position in the second column from above in the lateral direction to form one basic pattern (13×6+7 pixels). It is also assumed herein that a lowermost region is connected with an uppermost region in the vertical direction to form one basic pattern (13×6+7 pixels).

The laterally displaced relation of the basic patterns in each of the basic dither pattern (cyan) and the basic dither pattern (magenta) is specular-symmetric with respect to the vertical direction. In the basic dither pattern, as described above, the M×N (85×85) pixels light up in an order predetermined in accordance with a gradation level. Basically, this order is predetermined such that halftone dots in the basic pattern become bold gradually.

Figure 11:
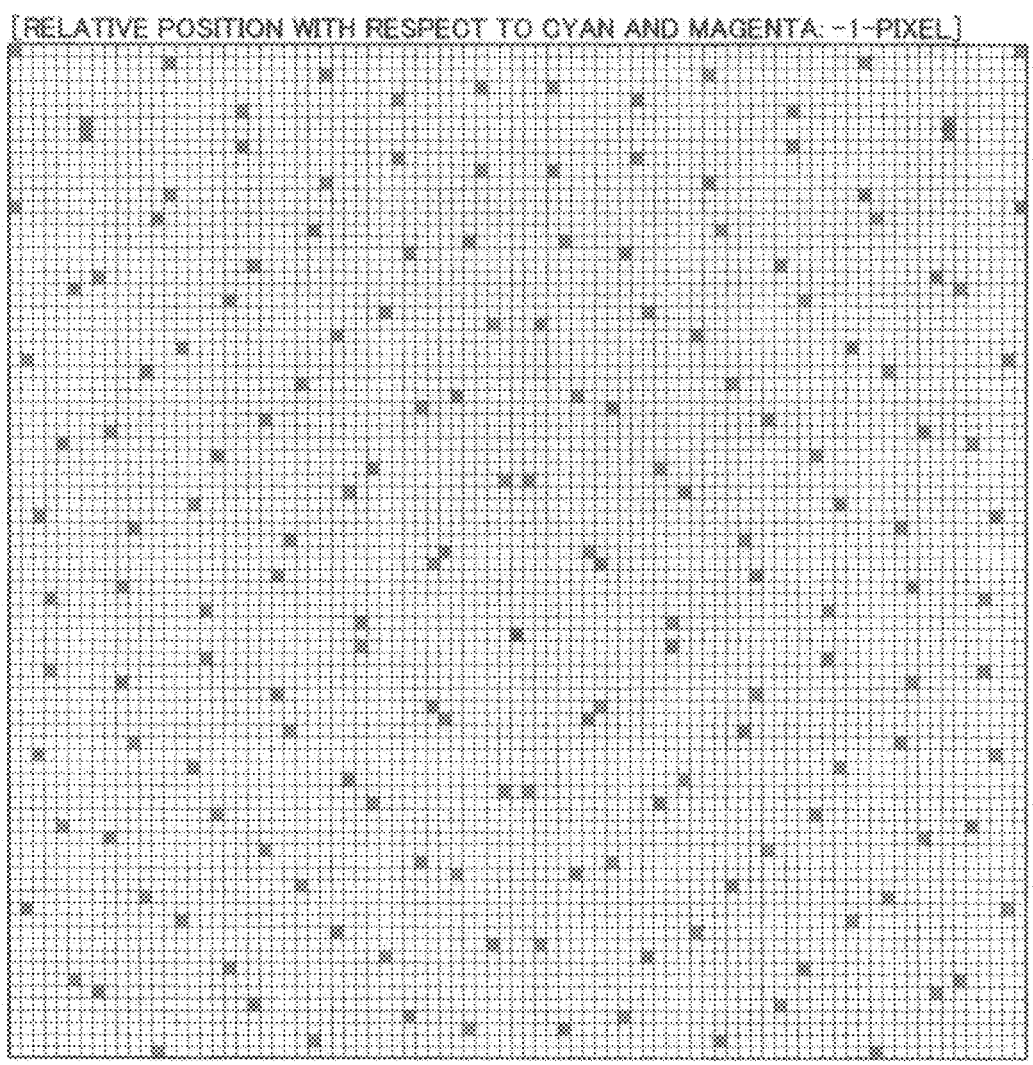
FIG. 11 shows a relative positional relation between the basic dither pattern (cyan) shown in FIG. 9 and the basic dither pattern (magenta) shown in FIG. 10 in a case where the two basic dither patterns are superposed with the basic dither pattern (magenta) displaced by one pixel in a negative direction.

With reference to FIG. 11, description will be given of a relative positional relation between the basic dither pattern (cyan) shown in FIG. 9 and the basic dither pattern (magenta) shown in FIG. 10 in a case where the two basic dither patterns are superposed with the basic dither pattern (magenta) displaced by one pixel in a negative direction (also referred to as a relative position of −1-pixel).

Figure 12:
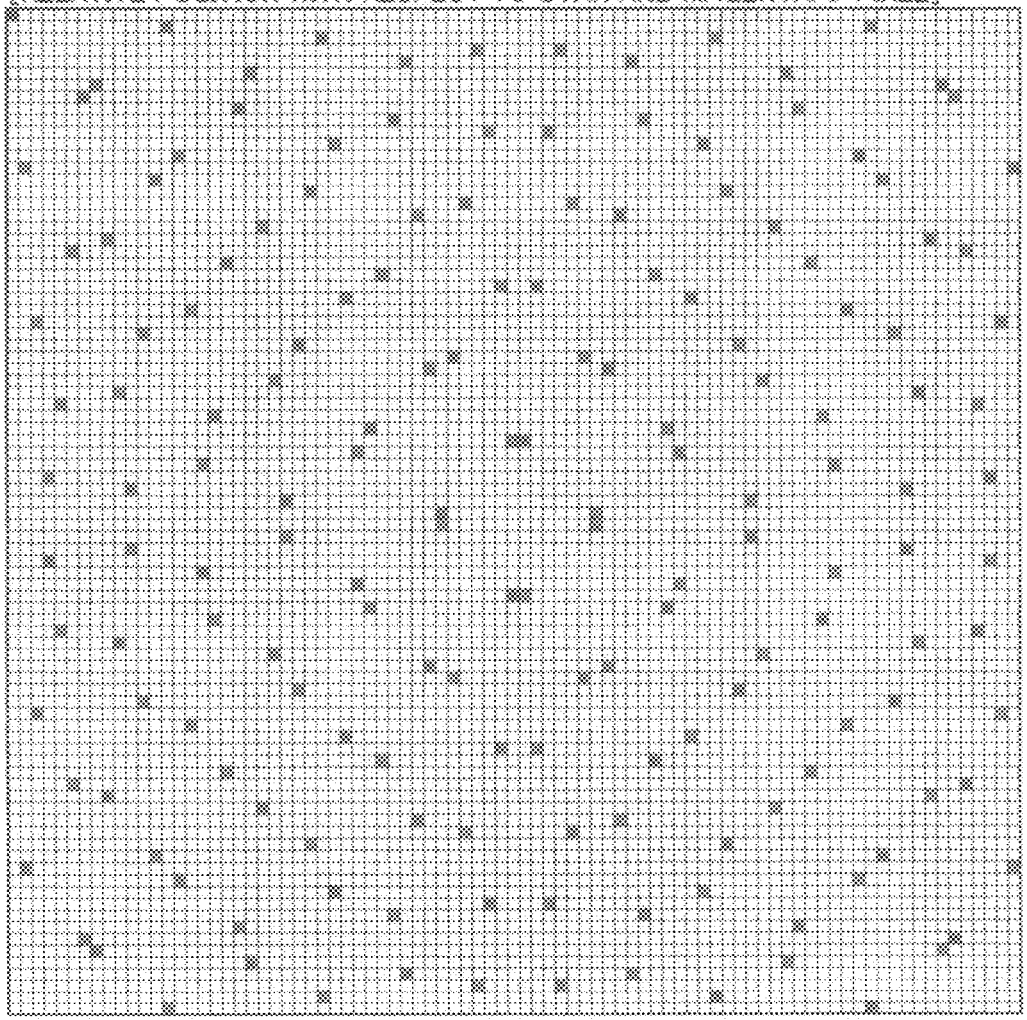
FIG. 12 shows a relative positional relation between the basic dither pattern (cyan) shown in FIG. 9 and the basic dither pattern (magenta) shown in FIG. 10 in a case where the two basic dither patterns are superposed without displacement.

With reference to FIG. 12, description will be given of a relative positional relation between the basic dither pattern (cyan) shown in FIG. 9 and the basic dither pattern (magenta) shown in FIG. 10 in a case where the two basic dither patterns are superposed without displacement (also referred to as a relative position of 0-pixel).

Figure 13:
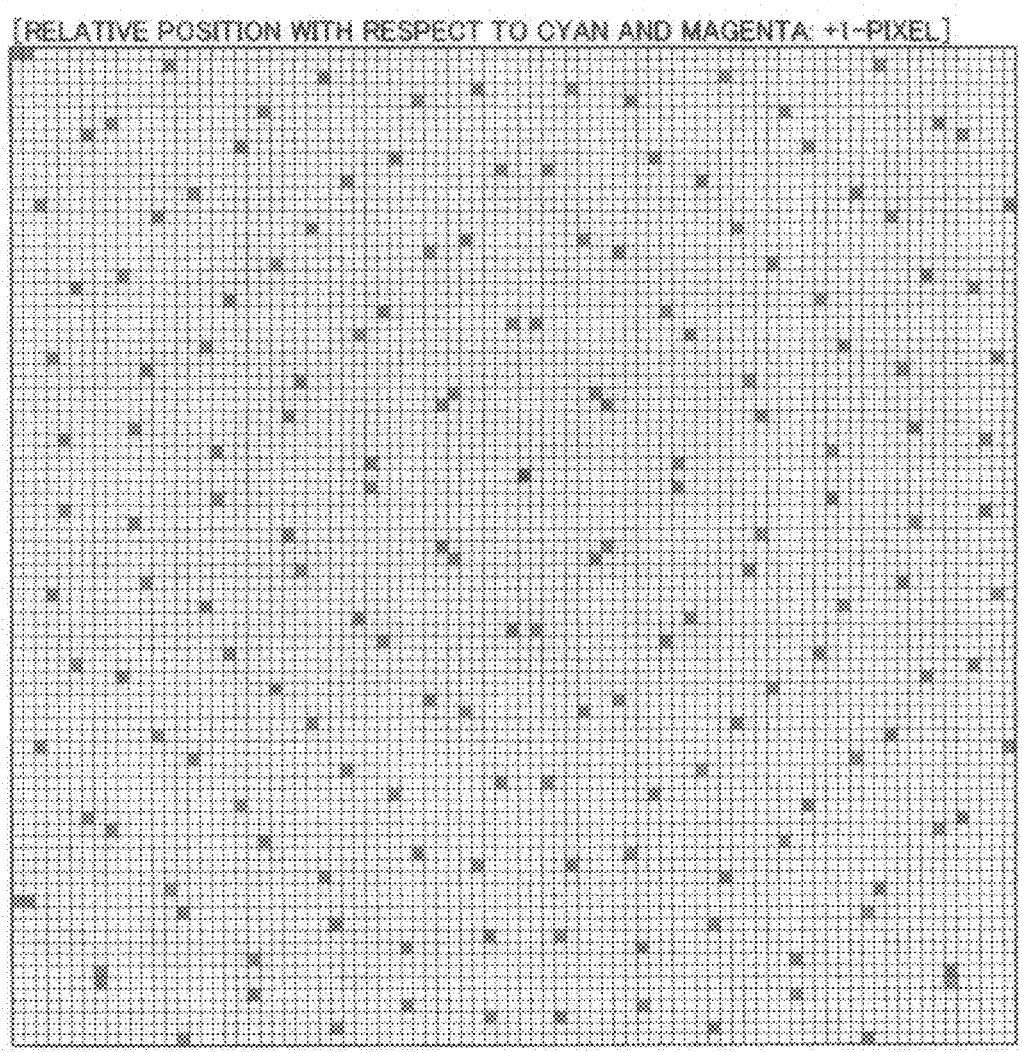
FIG. 13 shows a relative positional relation between the basic dither pattern (cyan) shown in FIG. 9 and the basic dither pattern (magenta) shown in FIG. 10 in a case where the two basic dither patterns are superposed with the basic dither pattern (magenta) displaced by one pixel in the positive direction.

With reference to FIG. 13, description will be given of a relative positional relation between the basic dither pattern (cyan) shown in FIG. 9 and the basic dither pattern (magenta) shown in FIG. 10 in a case where the two basic dither patterns are superposed with the basic dither pattern (magenta) displaced by one pixel in the positive direction (also referred to as a relative position of +1-pixel).

A halftone dot that forms a basic dither pattern has a size of 1×1 pixel. As shown in FIGS. 11 to 13, when the basic dither pattern (magenta) is displaced, a position of a pixel (blue) generated by superposition of pixels (cyan and magenta) is also changed.

In the second specific example of the basic dither pattern according to the embodiment of the present invention, as listed in Table 2 below, an area ratio of each color on a 85×85-matrix basis has no change in the case where the basic dither pattern (magenta) is displaced by one pixel in the lateral direction.

TABLE 2

|  | −1-Pixel | 0-Pixel | +1-Pixel |
|---|---|---|---|
| Cyan | 1.2% | 1.2% | 1.2% |
| Magenta | 1.2% | 1.2% | 1.2% |
| Blue | 0.0% | 0.0% | 0.0% |
| White | 97.7% | 97.7% | 97.7% |

Although not show in FIGS. 11 to 13, the area ratio of each color has no change even in a case where the relative position is changed in the vertical position. Moreover, a phenomenon similar to that in this case is exhibited even when the relative position is not based on 0.5-pixel or 1-pixel.

Figure 14:
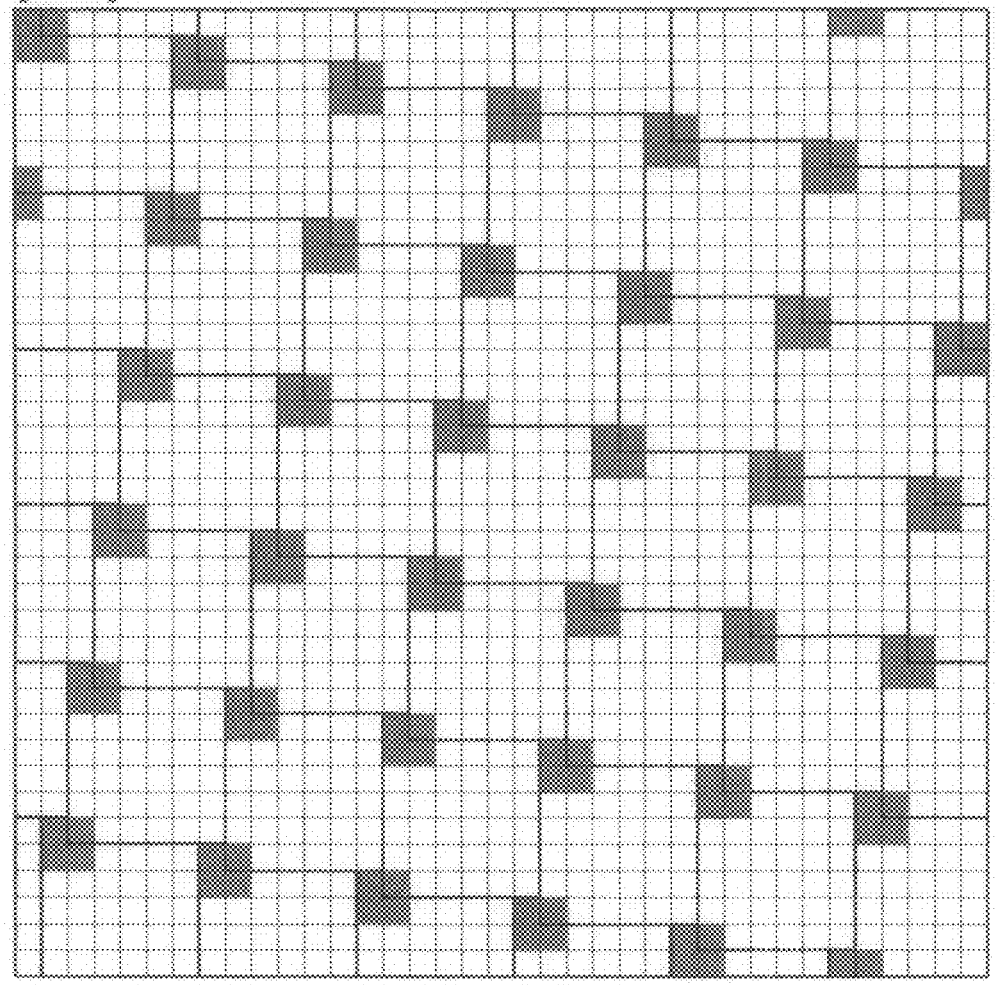
FIG. 14 shows a third specific example of the basic dither pattern (cyan) according to the embodiment of the present invention.

With reference to FIG. 14, description will be given of a third specific example of the basic dither pattern (cyan) according to the embodiment of the present invention.

Figure 15:
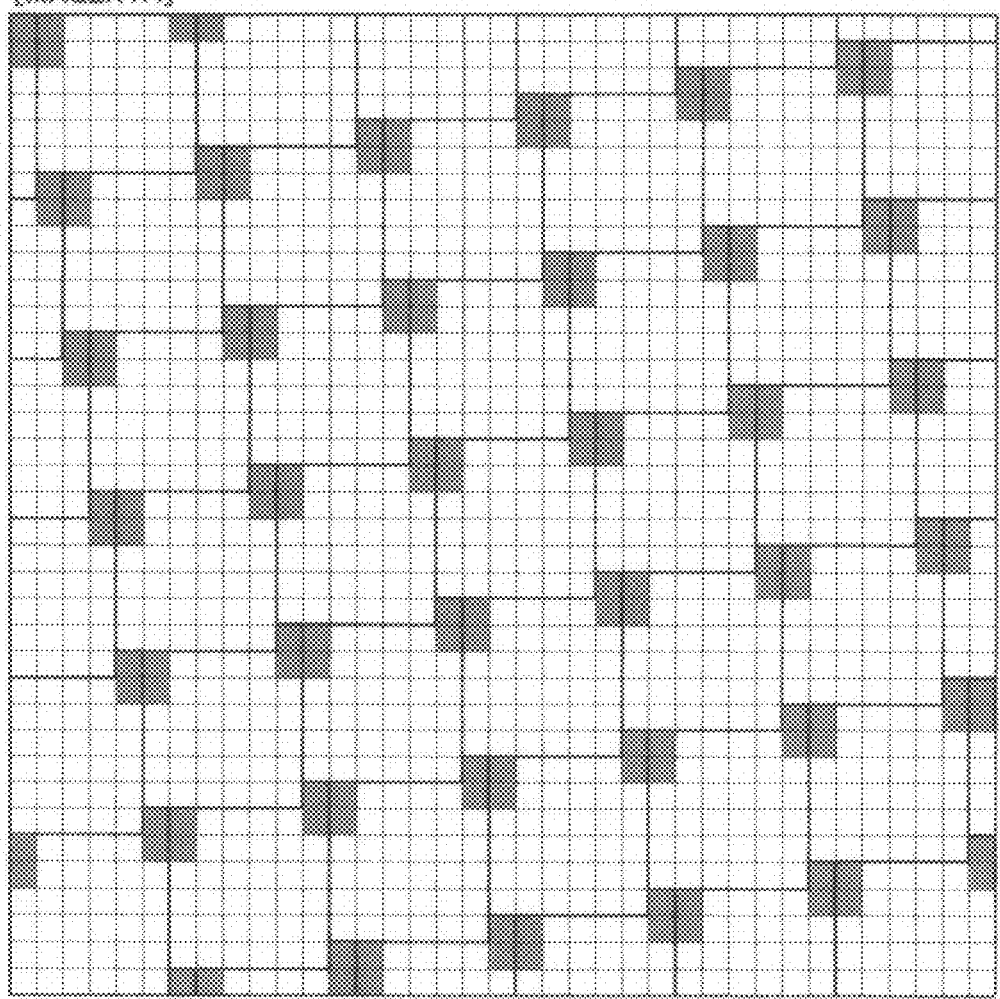
FIG. 15 shows a third specific example of the basic dither pattern (magenta) according to the embodiment of the present invention.

With reference to FIG. 15, description will be given of a third specific example of the basic dither pattern (magenta) according to the embodiment of the present invention.

As shown in FIGS. 14 and 15, the basic dither pattern has a size of 37×37 pixels. Each halftone dot has a size of 2×2 pixels. Herein, 37 halftone dots are arranged in the basic dither pattern.

Figure 16:
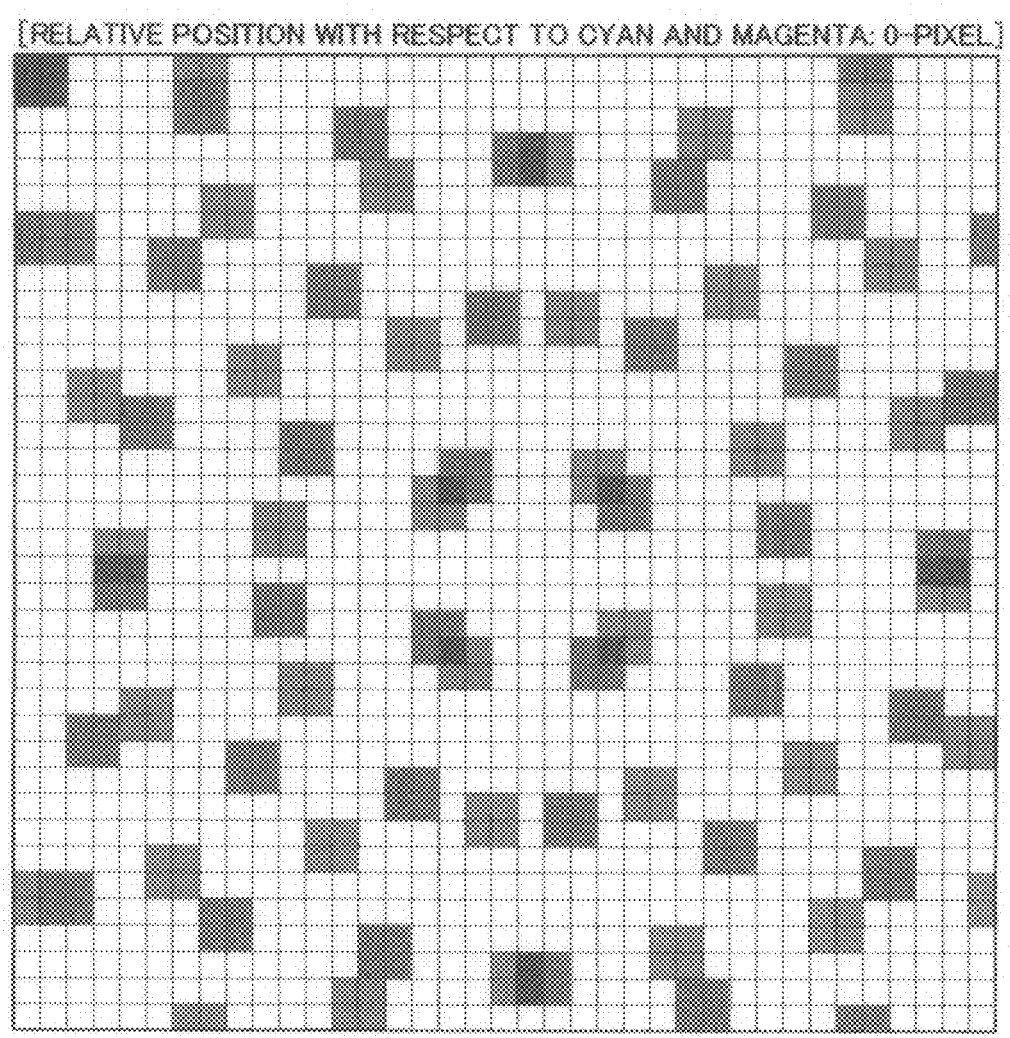
FIG. 16 shows a relative positional relation between the basic dither pattern (cyan) shown in FIG. 14 and the basic dither pattern (magenta) shown in FIG. 15 in a case where the two basic dither patterns are superposed without displacement.

With reference to FIG. 16, description will be given of a relative positional relation between the basic dither pattern (cyan) shown in FIG. 14 and the basic dither pattern (magenta) shown in FIG. 15 in a case where the two basic dither patterns are superposed without displacement (also referred to as a relative position of 0-pixel).

Figure 17:
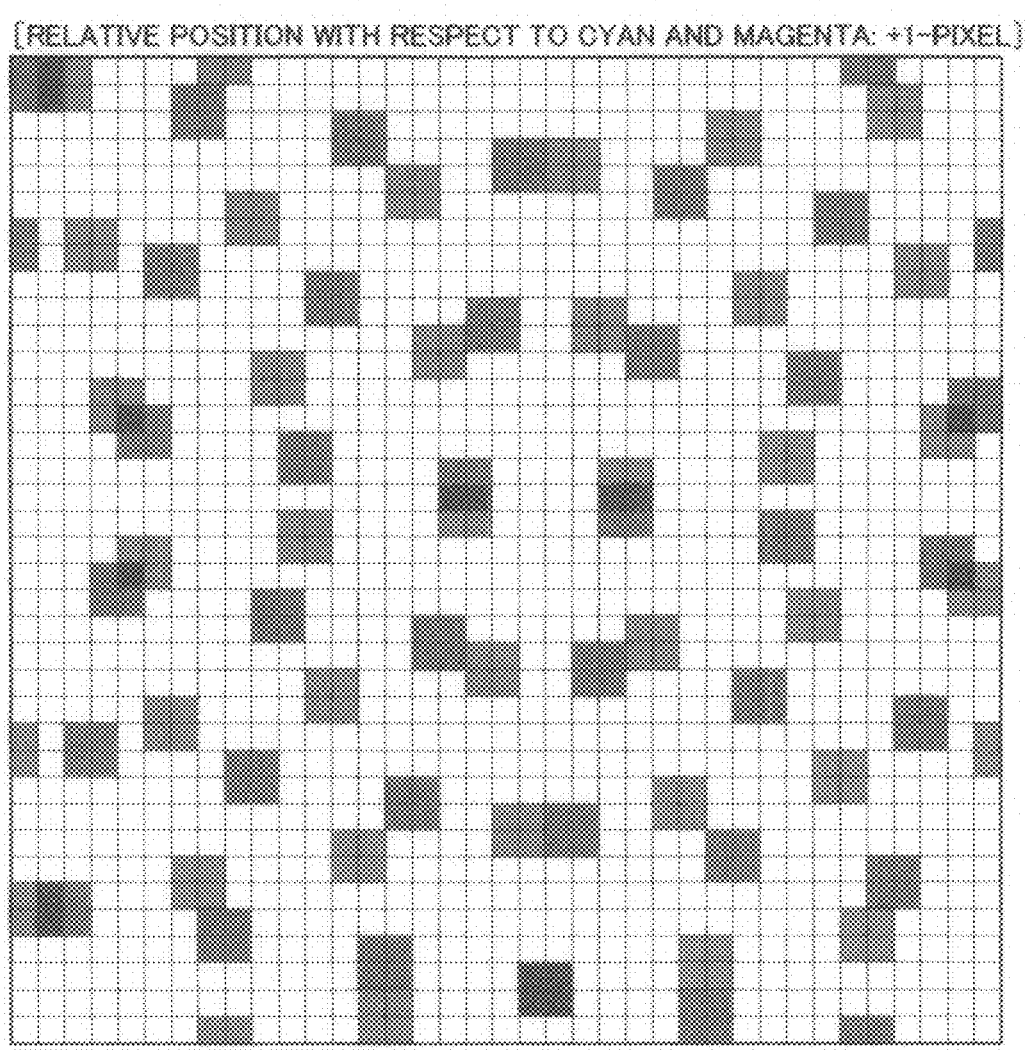
FIG. 17 shows a relative positional relation between the basic dither pattern (cyan) shown in FIG. 14 and the basic dither pattern (magenta) shown in FIG. 15 in a case where the two basic dither patterns are superposed with the basic dither pattern (magenta) displaced by one pixel in the positive direction.

With reference to FIG. 17, description will be given of a relative positional relation between the basic dither pattern (cyan) shown in FIG. 14 and the basic dither pattern (magenta) shown in FIG. 15 in a case where the two basic dither patterns are superposed with the basic dither pattern (magenta) displaced by one pixel in the positive direction (also referred to as a relative position of +1-pixel).

Figure 18:
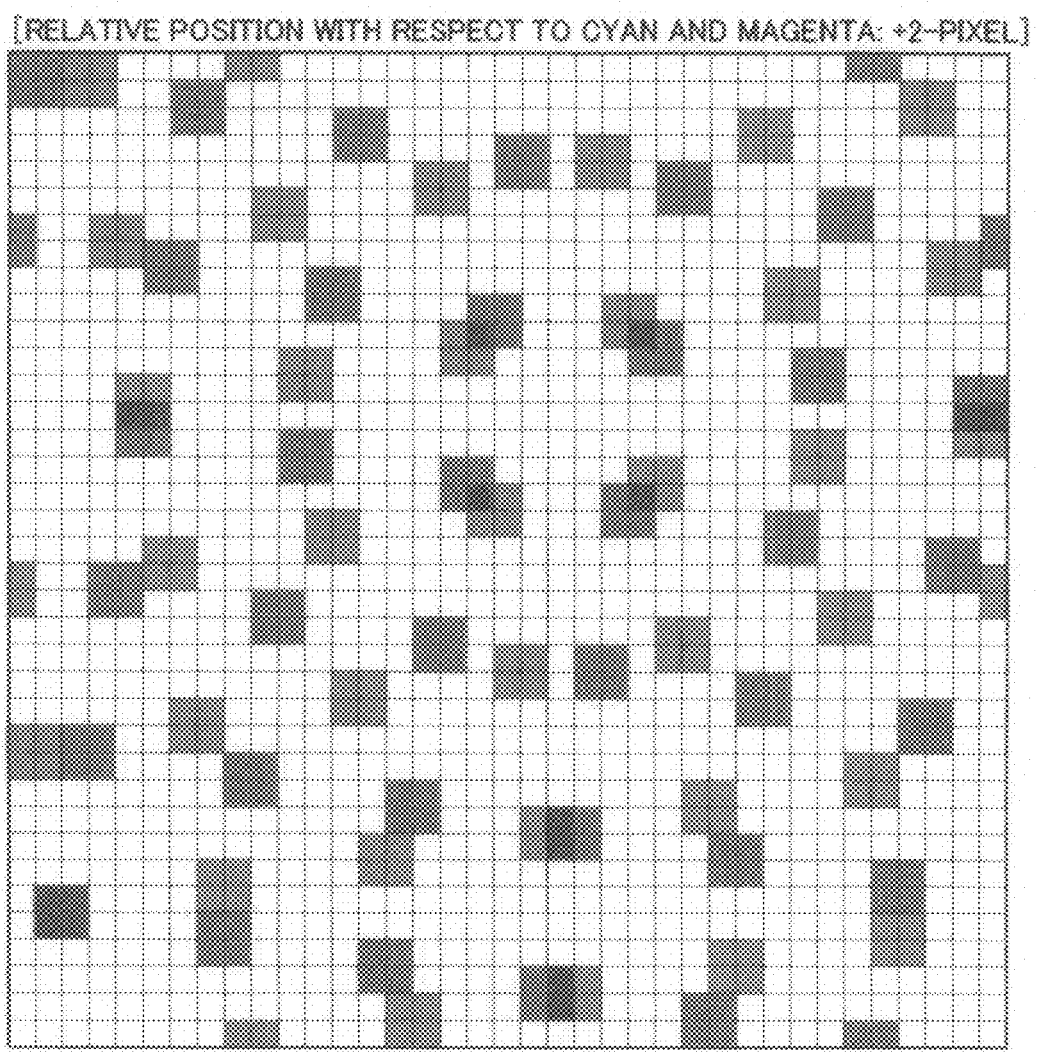
FIG. 18 shows a relative positional relation between the basic dither pattern (cyan) shown in FIG. 14 and the basic dither pattern (magenta) shown in FIG. 15 in a case where the two basic dither patterns are superposed with the basic dither pattern (magenta) displaced by two pixels in the positive direction.

With reference to FIG. 18, description will be given of a relative positional relation between the basic dither pattern (cyan) shown in FIG. 14 and the basic dither pattern (magenta) shown in FIG. 15 in a case where the two basic dither patterns are superposed with the basic dither pattern (magenta) displaced by two pixels in the positive direction (also referred to as a relative position of +2-pixel).

As described above, each halftone dot forming the basic dither pattern has the size of 2×2 pixels. As shown in FIGS. 16 to 18, when the basic dither pattern (magenta) is displaced, a position of a pixel (blue) generated by superposition of pixels (cyan and magenta) is also changed.

In the third specific example of the basic dither pattern according to the embodiment of the present invention, as listed in Table 3 below, an area ratio of each color on a 37×37-matrix basis has no change in the case where the basic dither pattern (magenta) is displaced by one pixel in the lateral direction.

TABLE 3

|  | 0-Pixel | 1-Pixel | 2-Pixel |
|---|---|---|---|
| Cyan | 9.6% | 9.6% | 9.6% |
| Magenta | 9.6% | 9.6% | 9.6% |
| Blue | 1.2% | 1.2% | 1.2% |
| White | 79.5% | 79.5% | 79.5% |

Figure 19:
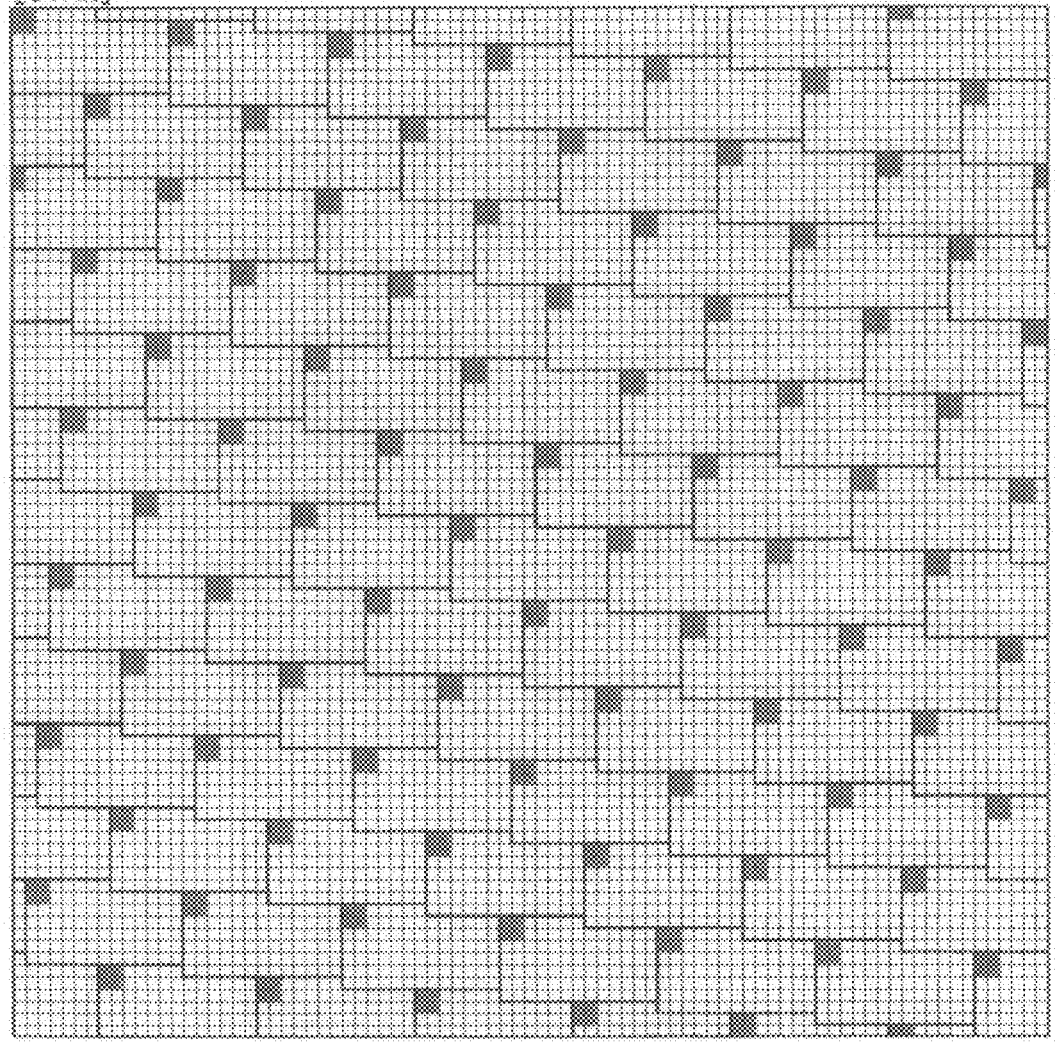
FIG. 19 shows a fourth specific example of the basic dither pattern (cyan) according to the embodiment of the present invention.

With reference to FIG. 19, description will be given of a fourth specific example of the basic dither pattern (cyan) according to the embodiment of the present invention.

Figure 20:
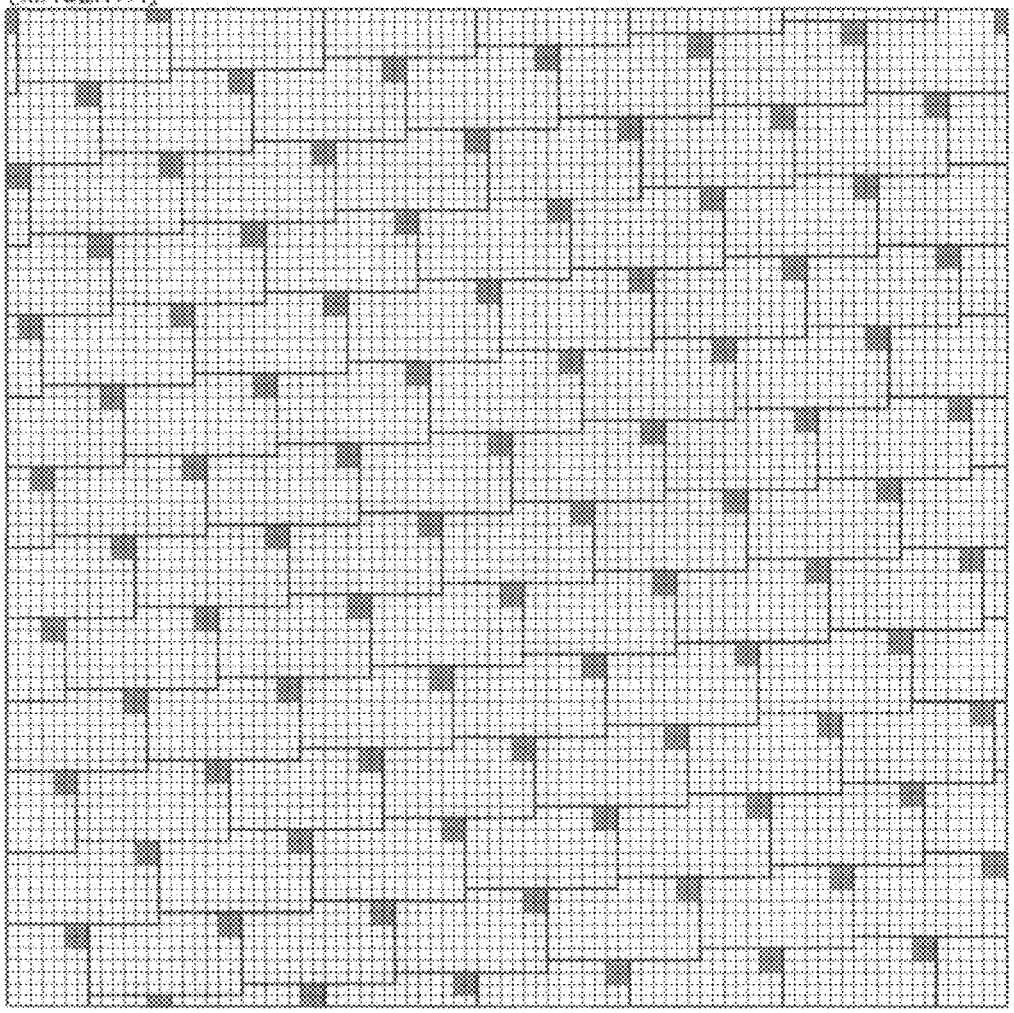
FIG. 20 shows a fourth specific example of the basic dither pattern (magenta) according to the embodiment of the present invention.

With reference to FIG. 20, description will be given of a fourth specific example of the basic dither pattern (magenta) according to the embodiment of the present invention.

Herein, the basic dither pattern has a size of 85×85 pixels. Each halftone dot has a size of 2×2 pixels. Herein, 85 halftone dots are arranged in the basic dither pattern.

Figure 21:
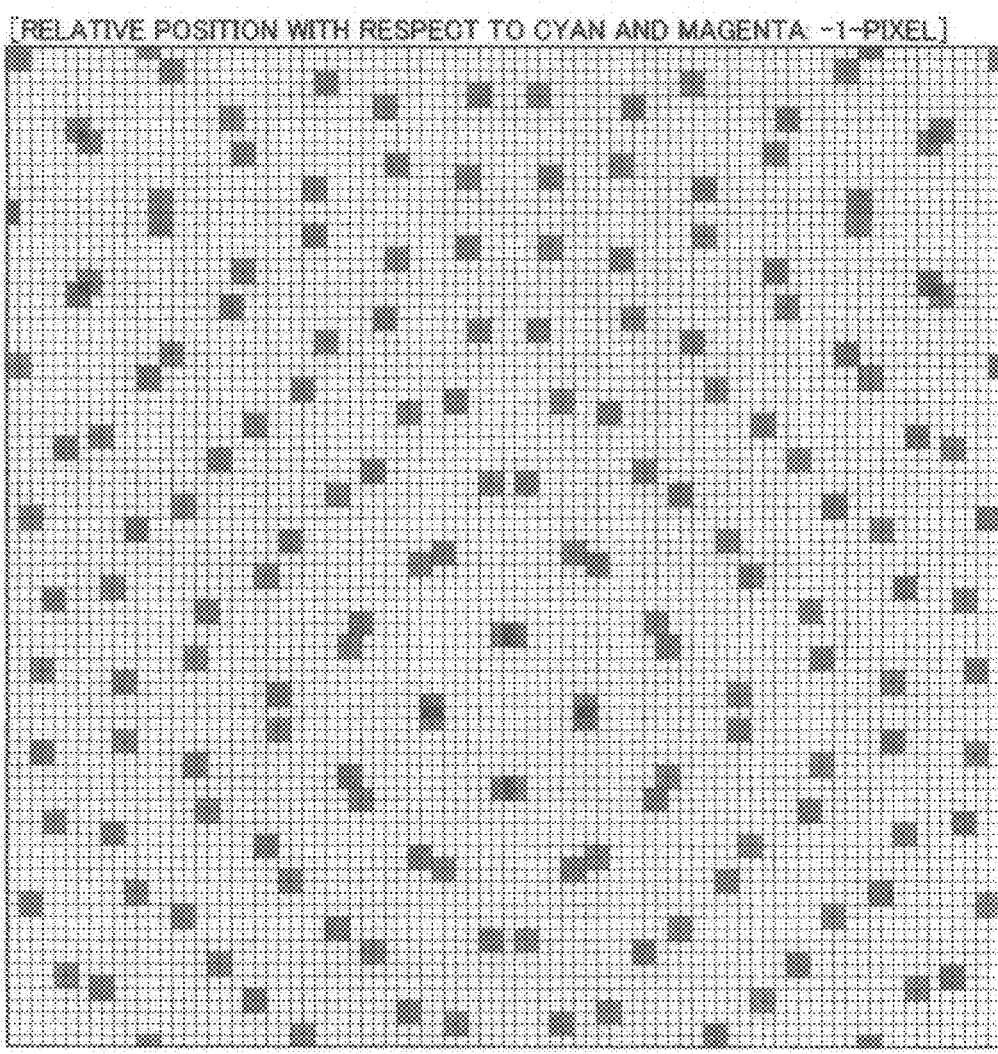
FIG. 21 shows a relative positional relation between the basic dither pattern (cyan) shown in FIG. 19 and the basic dither pattern (magenta) shown in FIG. 20 in a case where the two basic dither patterns are superposed with the basic dither pattern (magenta) displaced by one pixel in the negative direction.

With reference to FIG. 21, description will be given of a relative positional relation between the basic dither pattern (cyan) shown in FIG. 19 and the basic dither pattern (magenta) shown in FIG. 20 in a case where the two basic dither patterns are superposed with the basic dither pattern (magenta) displaced by one pixel in the negative direction (also referred to as a relative position of −1-pixel).

Figure 22:
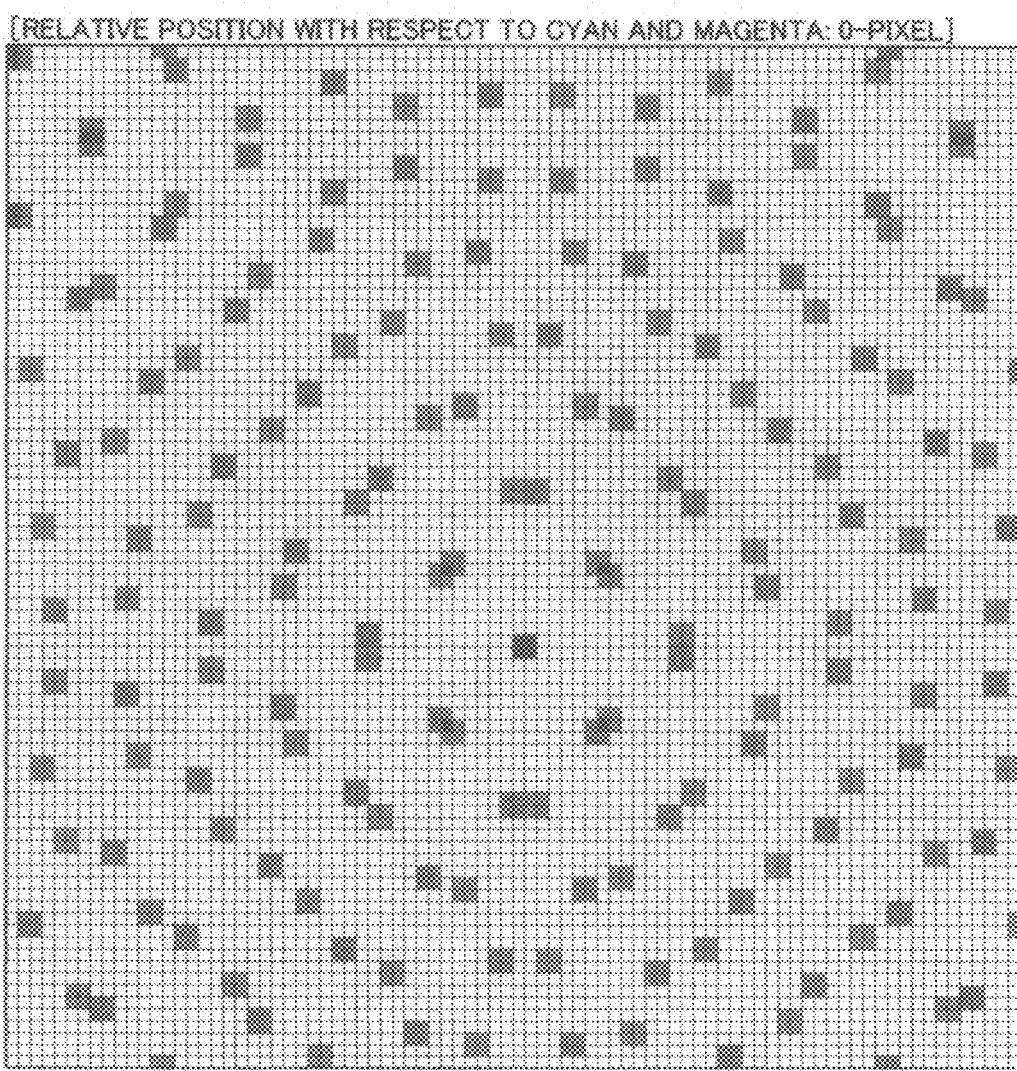
FIG. 22 shows a relative positional relation between the basic dither pattern (cyan) shown in FIG. 19 and the basic dither pattern (magenta) shown in FIG. 20 in a case where the two basic dither patterns are superposed without displacement.

With reference to FIG. 22, description will be given of a relative positional relation between the basic dither pattern (cyan) shown in FIG. 19 and the basic dither pattern (magenta) shown in FIG. 20 in a case where the two basic dither patterns are superposed without displacement (also referred to as a relative position of 0-pixel).

Figure 23:
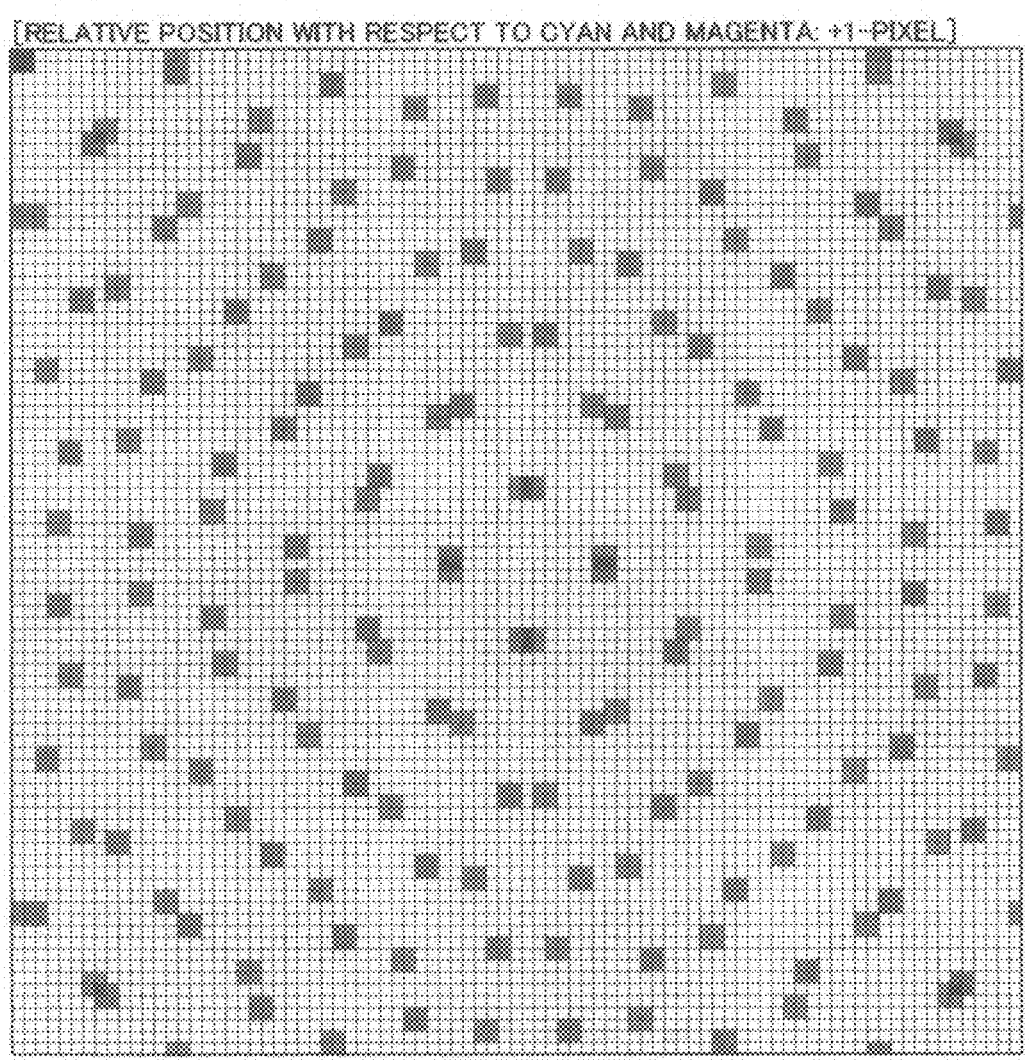
FIG. 23 shows a relative positional relation between the basic dither pattern (cyan) shown in FIG. 19 and the basic dither pattern (magenta) shown in FIG. 20 in a case where the two basic dither patterns are superposed with the basic dither pattern (magenta) displaced by one pixel in the positive direction.

With reference to FIG. 23, description will be given of a relative positional relation between the basic dither pattern (cyan) shown in FIG. 19 and the basic dither pattern (magenta) shown in FIG. 20 in a case where the two basic dither patterns are superposed with the basic dither pattern (magenta) displaced by one pixel in the positive direction (also referred to as a relative position of +1-pixel).

As described above, each halftone dot forming the basic dither pattern has the size of 2×2 pixels. As shown in FIGS. 21 to 23, when the basic dither pattern (magenta) is displaced, a position of a pixel (blue) generated by superposition of pixels (cyan and magenta) is also changed.

In the fourth specific example of the basic dither pattern according to the embodiment of the present invention, as listed in Table 4 below, an area ratio of each color on a 85×85-matrix basis has no change in the case where the basic dither pattern (magenta) is displaced by one pixel in the lateral direction.

TABLE 4

|  | −1-Pixel | 0-Pixel | +1-Pixel |
|---|---|---|---|
| Cyan | 4.5% | 4.5% | 4.5% |
| Magenta | 4.5% | 4.5% | 4.5% |
| Blue | 0.2% | 0.2% | 0.2% |
| White | 90.8% | 90.8% | 90.8% |

Although not shown in FIGS. 21 to 23, the area ratio of each color has no change even in a case where the relative position is changed in the vertical position. Moreover, a phenomenon similar to that in this case is exhibited even when the relative position is not based on 0.5-pixel or 1-pixel.

Figure 24:
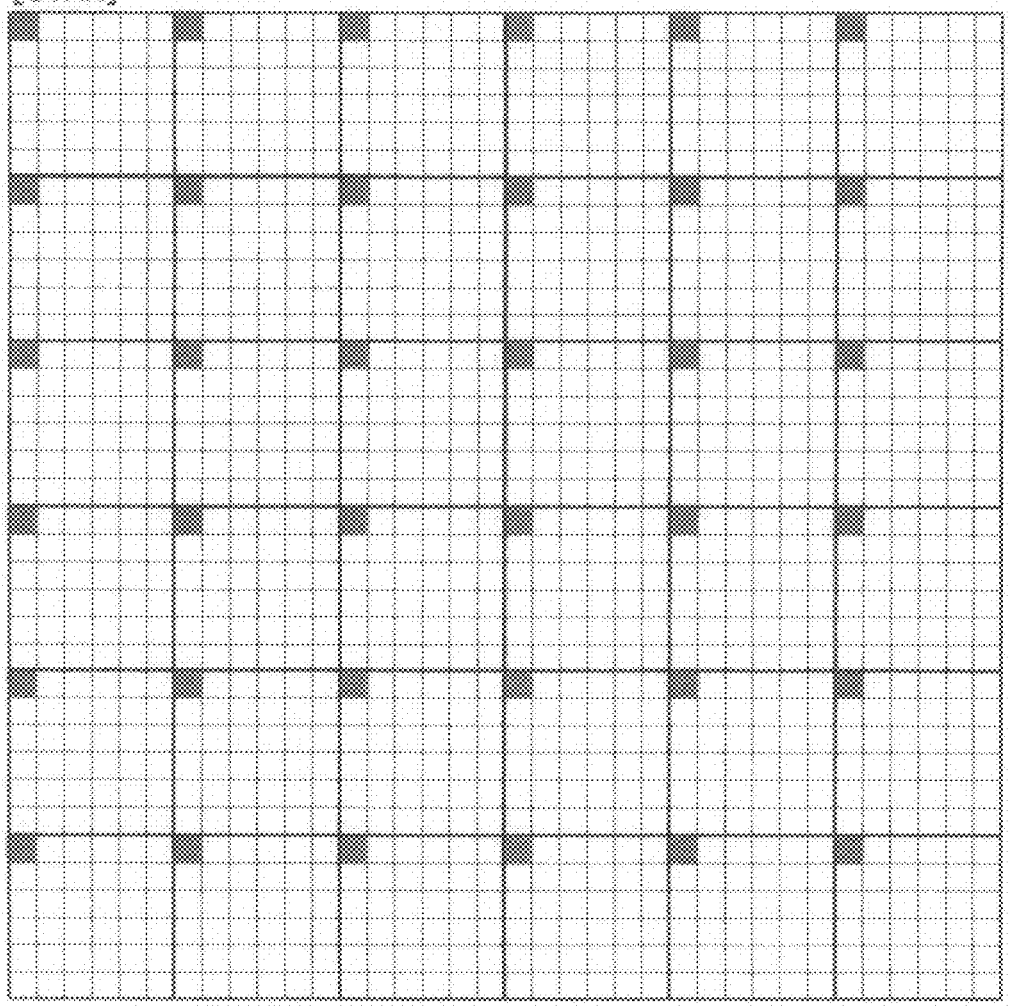
FIG. 24 shows a fifth specific example of a conventional basic dither pattern (cyan).

With reference to FIG. 24, description will be given of a fifth specific example of a conventional basic dither pattern (cyan).

Figure 25:
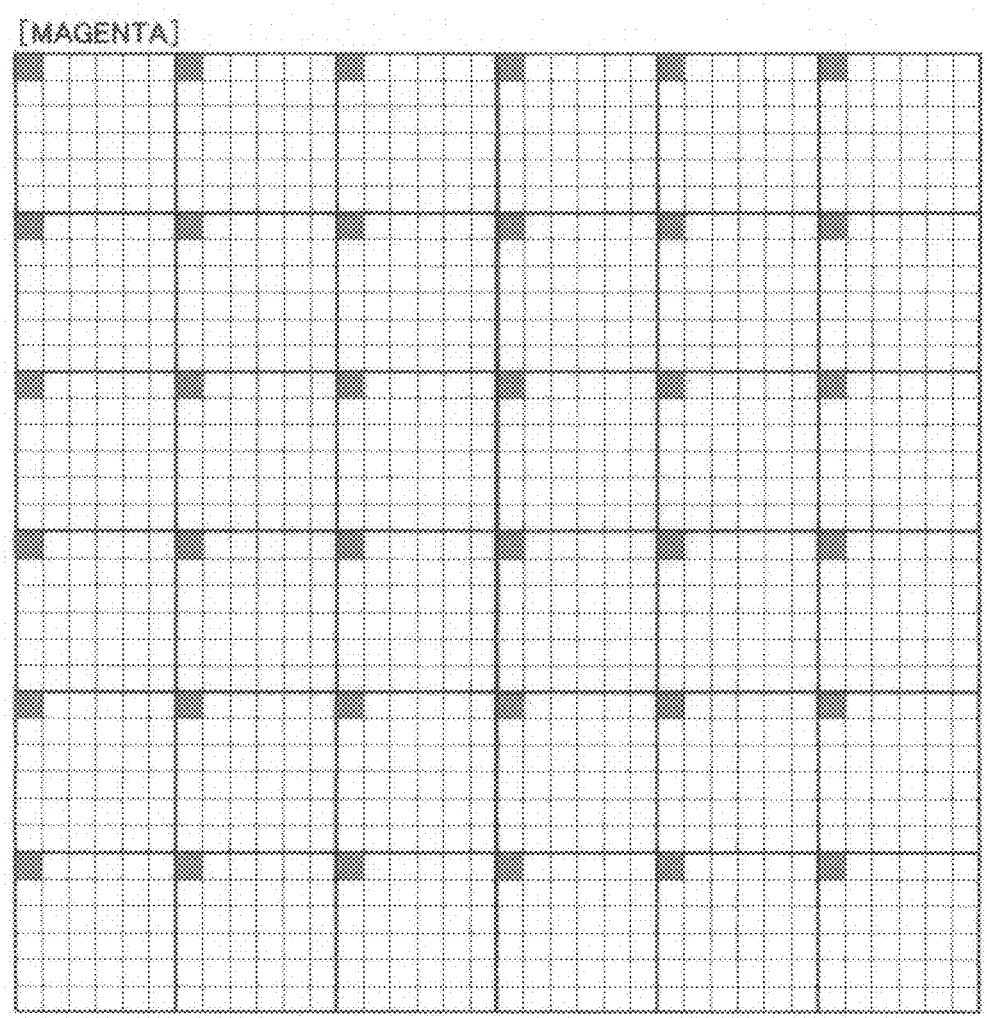
FIG. 25 shows a fifth specific example of a conventional basic dither pattern (magenta).

With reference to FIG. 25, description will be given of a fifth specific example of a conventional basic dither pattern (magenta).

As shown in FIGS. 24 and 25, the basic dither pattern has a size of 36×36 pixels. Each halftone dot has a size of 1×1 pixel. Herein, 36 halftone dots are arranged in the basic dither pattern.

In a case where one pixel is 1200 dpi for image formation, the number of screen lines in the basic dither pattern is about 200 lpi, which is almost equal to the number of screen lines in the basic dither pattern according to the embodiment of the present invention.

Figure 26:
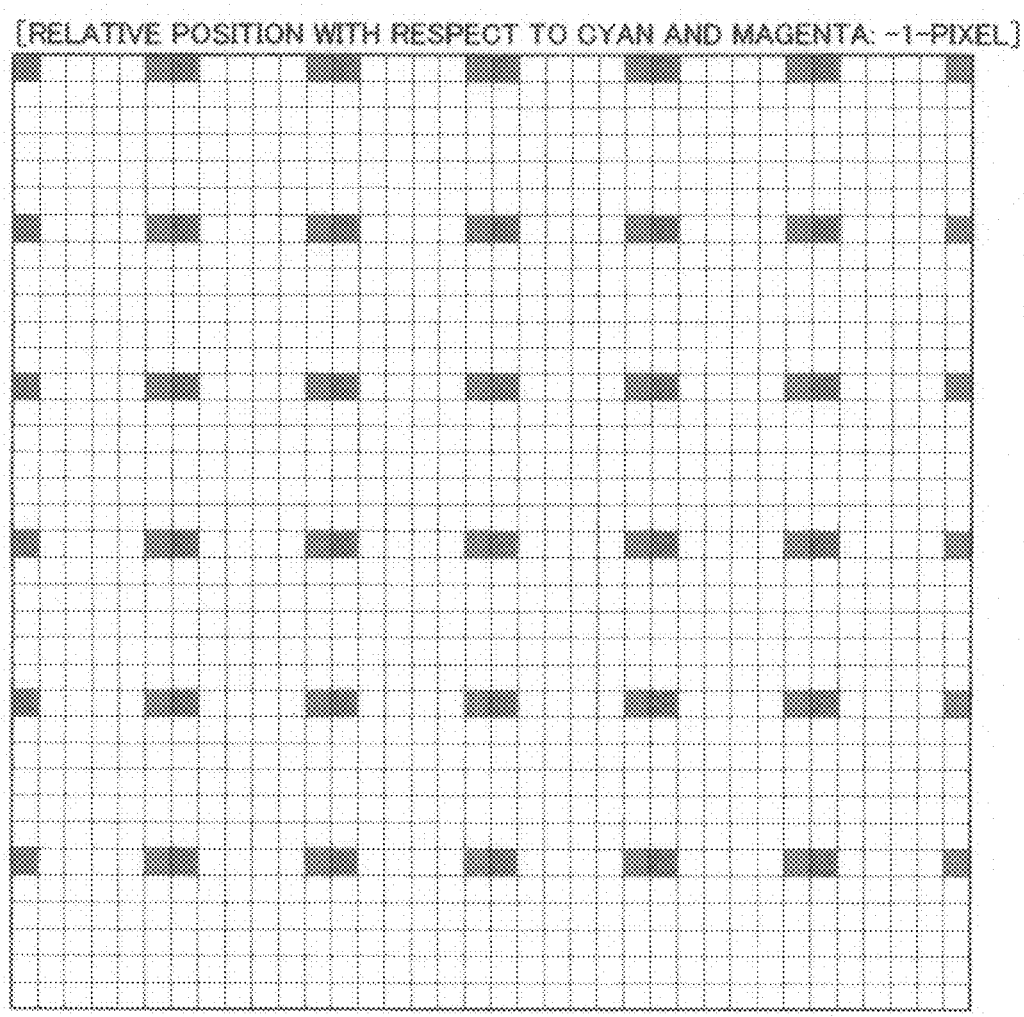
FIG. 26 shows a relative positional relation between the basic dither pattern (cyan) shown in FIG. 24 and the basic dither pattern (magenta) shown in FIG. 25 in a case where the two basic dither patterns are superposed with the basic dither pattern (magenta) displaced by one pixel in the negative direction.

With reference to FIG. 26, description will be given of a relative positional relation between the basic dither pattern (cyan) shown in FIG. 24 and the basic dither pattern (magenta) shown in FIG. 25 in a case where the two basic dither patterns are superposed with the basic dither pattern (magenta) displaced by one pixel in the negative direction (also referred to as a relative position of −1-pixel).

Figure 27:
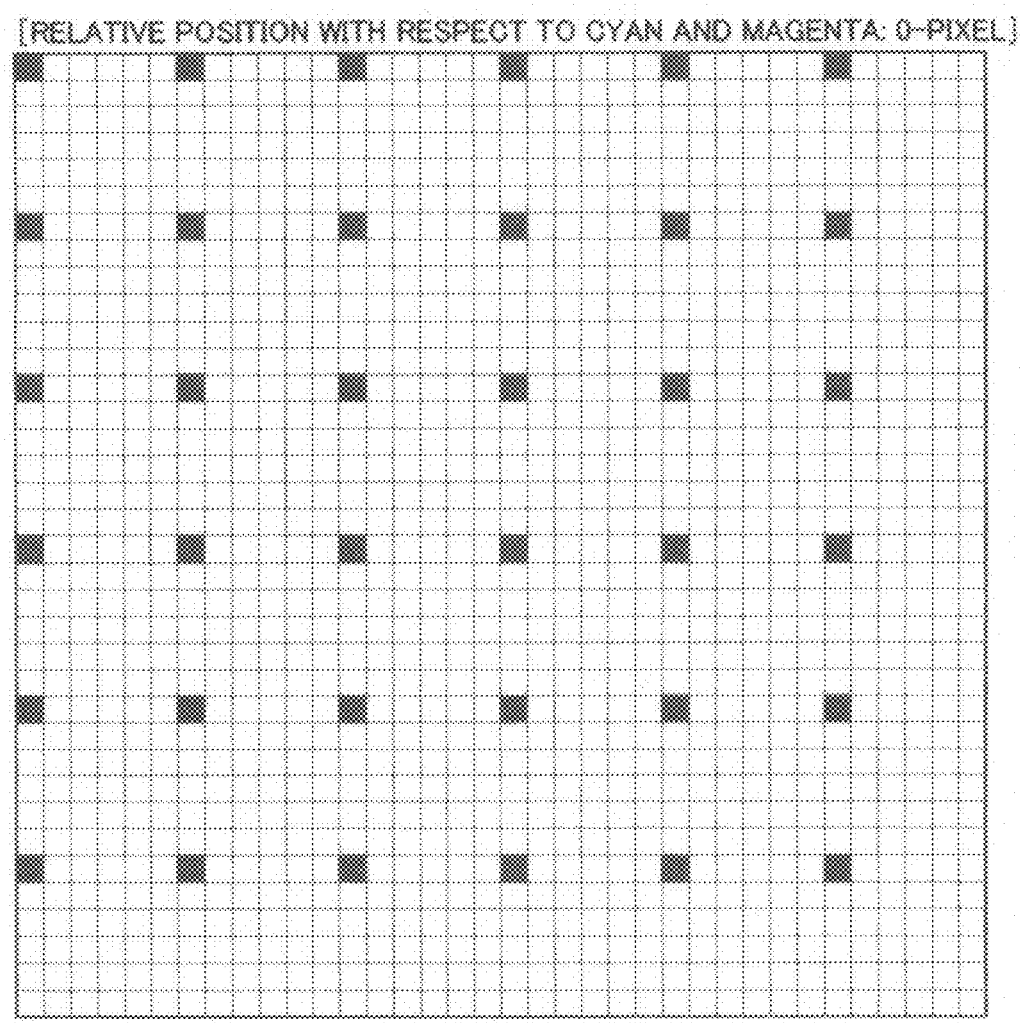
FIG. 27 shows a relative positional relation between the basic dither pattern (cyan) shown in FIG. 24 and the basic dither pattern (magenta) shown in FIG. 25 in a case where the two basic dither patterns are superposed without displacement.

With reference to FIG. 27, description will be given of a relative positional relation between the basic dither pattern (cyan) shown in FIG. 24 and the basic dither pattern (magenta) shown in FIG. 25 in a case where the two basic dither patterns are superposed without displacement (also referred to as a relative position of 0-pixel).

Figure 28:
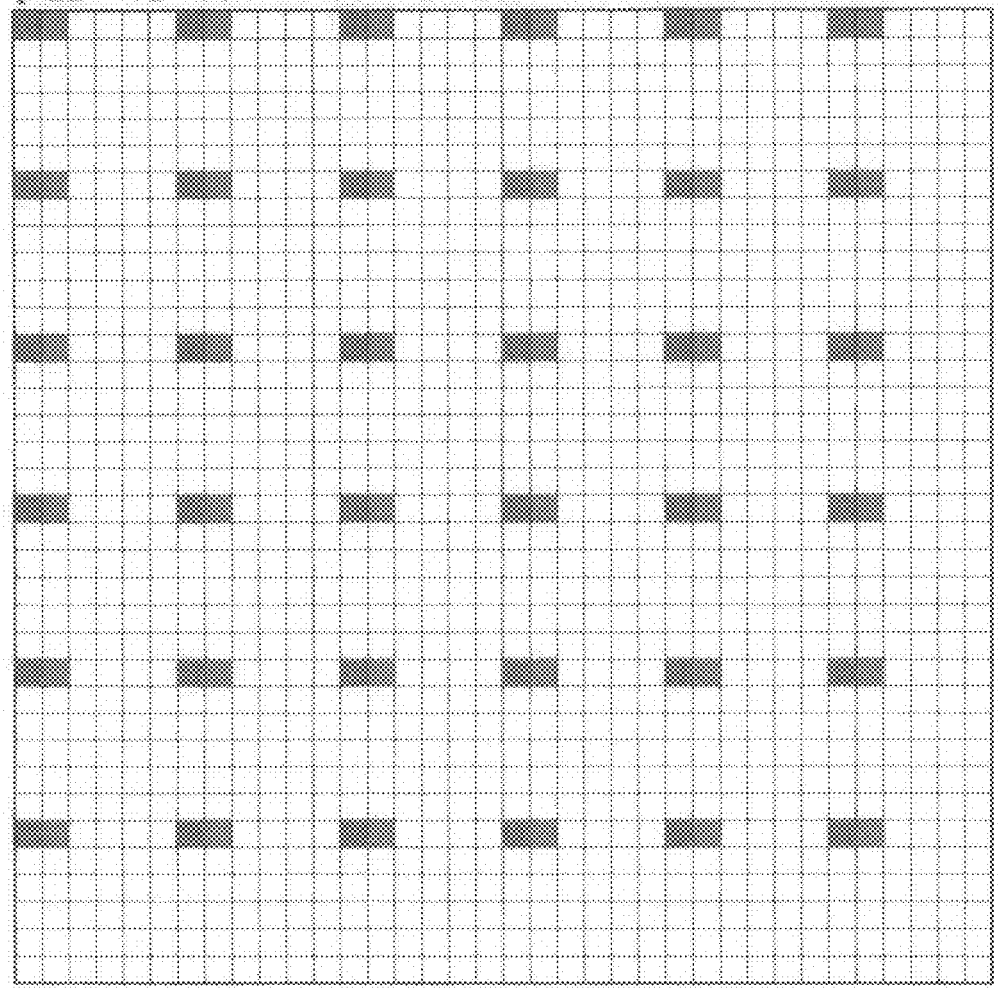
FIG. 28 shows a relative positional relation between the basic dither pattern (cyan) shown in FIG. 24 and the basic dither pattern (magenta) shown in FIG. 25 in a case where the two basic dither patterns are superposed with the basic dither pattern (magenta) displaced by one pixel in the positive direction.

With reference to FIG. 28, description will be given of a relative positional relation between the basic dither pattern (cyan) shown in FIG. 24 and the basic dither pattern (magenta) shown in FIG. 25 in a case where the two basic dither patterns are superposed with the basic dither pattern (magenta) displaced by one pixel in the positive direction (also referred to as a relative position of +1-pixel).

As described above, each halftone dot forming the basic dither pattern has the size of 1×1 pixel. As shown in FIGS. 26 to 28, when the basic dither pattern (magenta) is displaced, a position of a pixel (blue) generated by superposition of pixels (cyan and magenta) is also changed.

In the fifth specific example of the conventional basic dither pattern, as listed in Table 5 below, an area ratio of each color on a matrix basis varies in the relative positional relation. More specifically, such an area ratio may vary in the case where the basic dither pattern (magenta) is displaced by one pixel in the lateral direction.

TABLE 5

|  | −1-Pixel | 0-Pixel | +1-Pixel |
|---|---|---|---|
| Cyan | 2.8% | 0.0% | 2.8% |
| Magenta | 2.8% | 0.0% | 2.8% |
| Blue | 0.0% | 2.8% | 0.0% |
| White | 94.4% | 97.2% | 94.4% |

Figure 29:
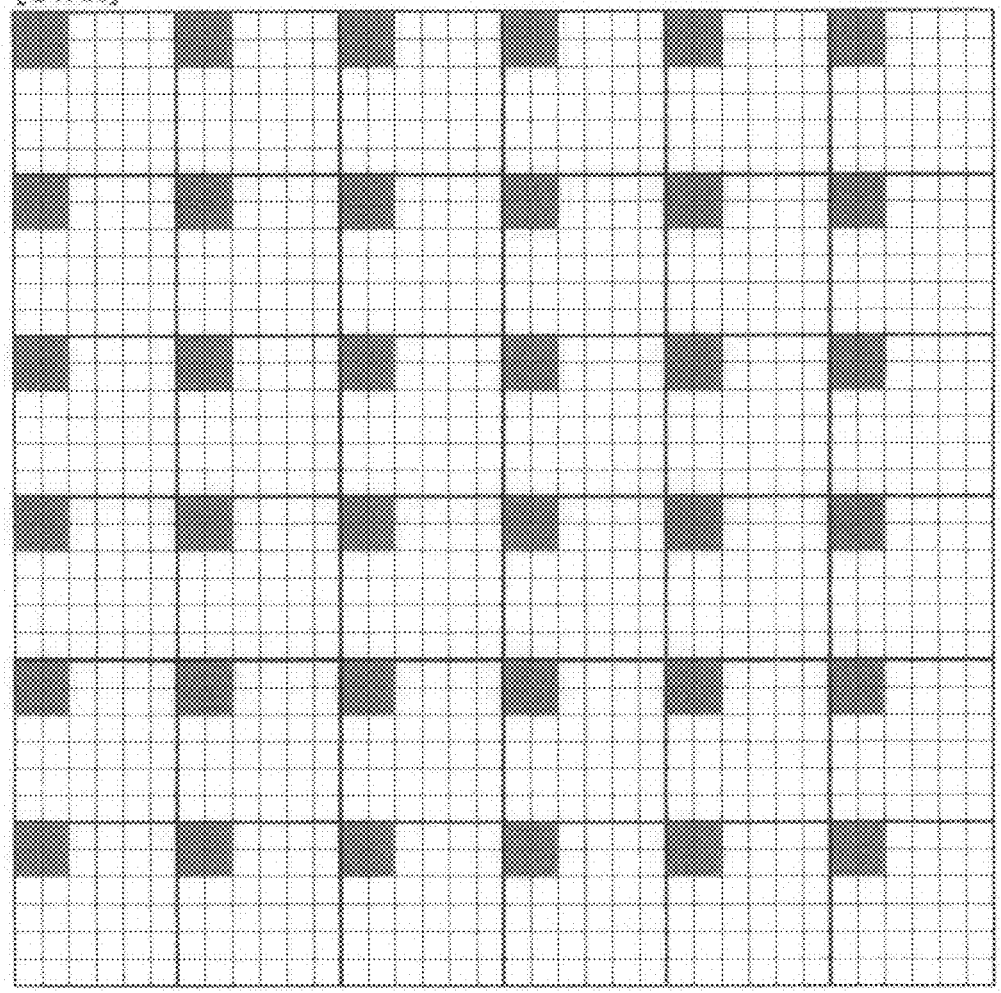
FIG. 29 shows a sixth specific example of the conventional basic dither pattern (cyan).

With reference to FIG. 29, description will be given of a sixth specific example of the conventional basic dither pattern (cyan).

Figure 30:
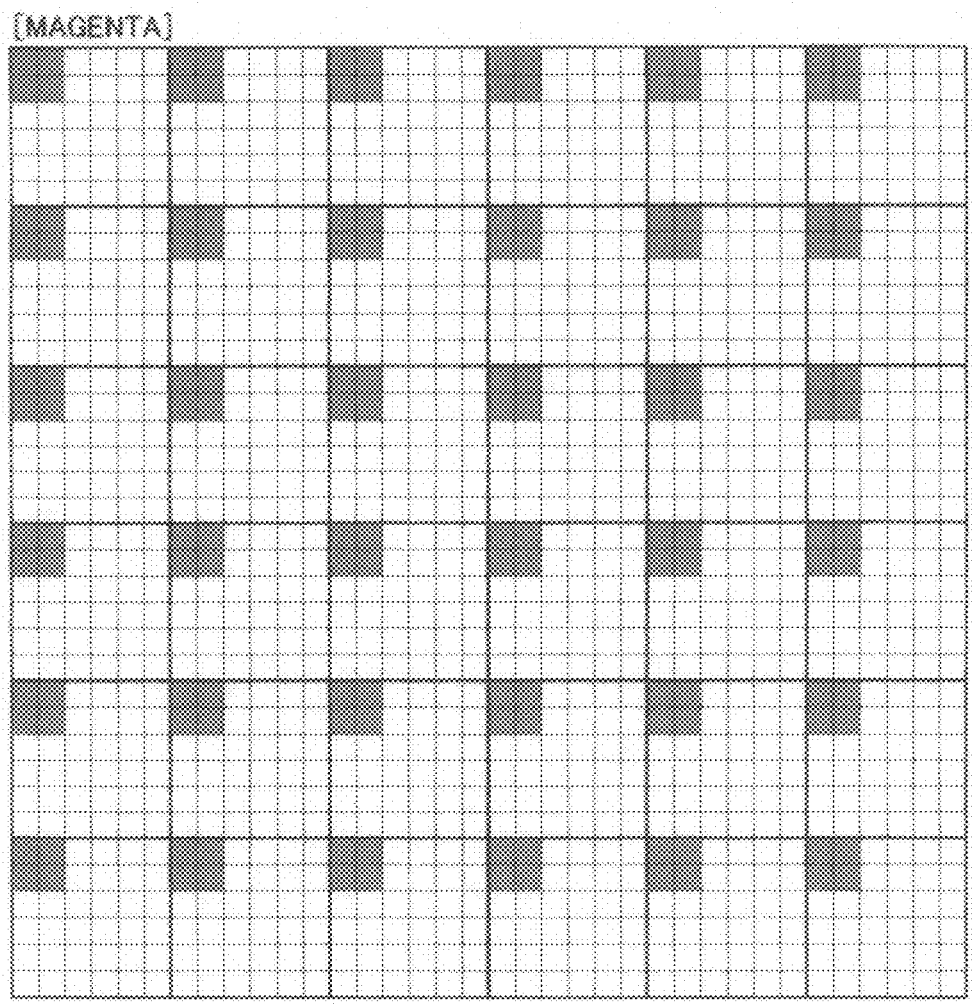
FIG. 30 shows a sixth specific example of the conventional basic dither pattern (magenta).

With reference to FIG. 30, description will be given of a sixth specific example of the conventional basic dither pattern (magenta).

As shown in FIGS. 29 and 30, the basic dither pattern has a size of 36×36 pixels. Each halftone dot has a size of 2×2 pixels. Herein, 36 halftone dots are arranged in the basic dither pattern.

Figure 31:
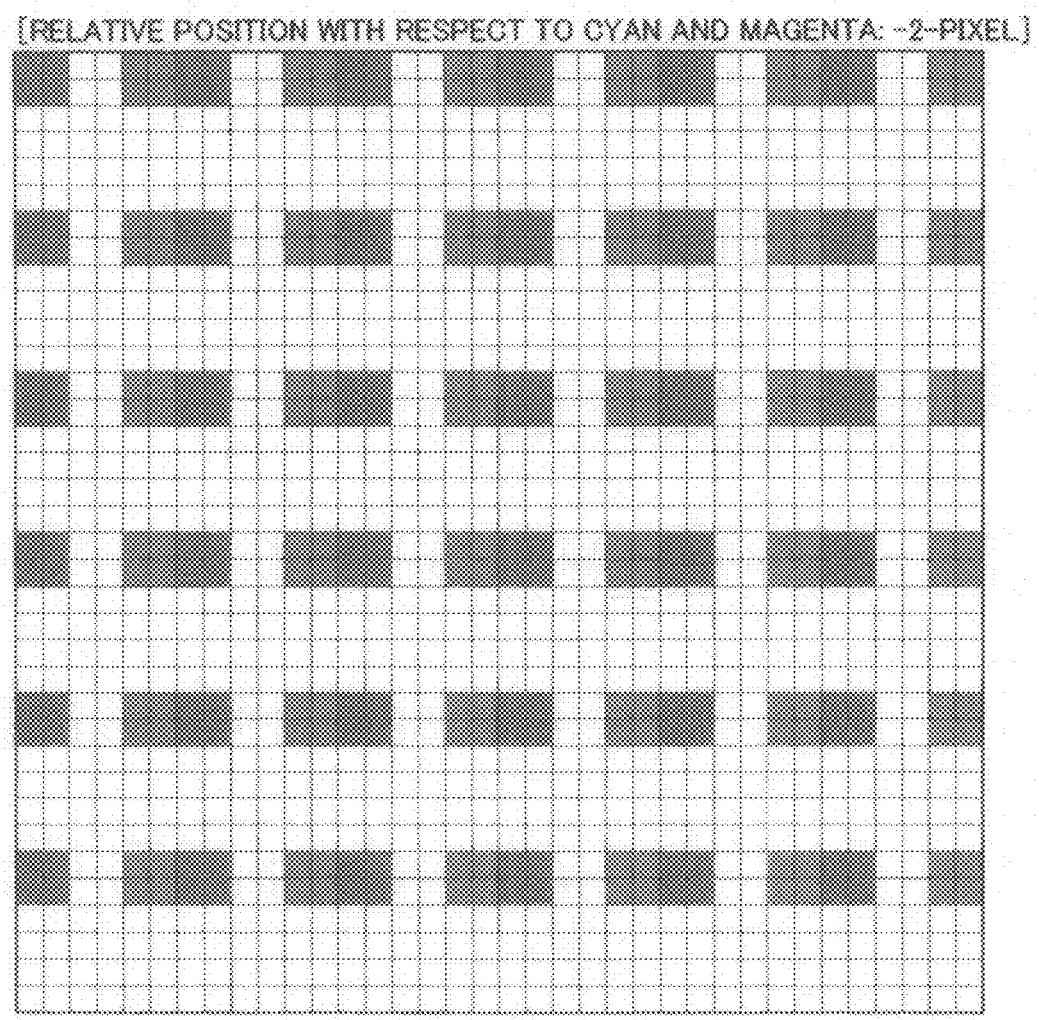
FIG. 31 shows a relative positional relation between the basic dither pattern (cyan) shown in FIG. 29 and the basic dither pattern (magenta) shown in FIG. 30 in a case where the two basic dither patterns are superposed with the basic dither pattern (magenta) displaced by two pixels in the negative direction.

With reference to FIG. 31, description will be given of a relative positional relation between the basic dither pattern (cyan) shown in FIG. 29 and the basic dither pattern (magenta) shown in FIG. 30 in a case where the two basic dither patterns are superposed with the basic dither pattern (magenta) displaced by two pixels in the negative direction (also referred to as a relative position of −2-pixel).

Figure 32:
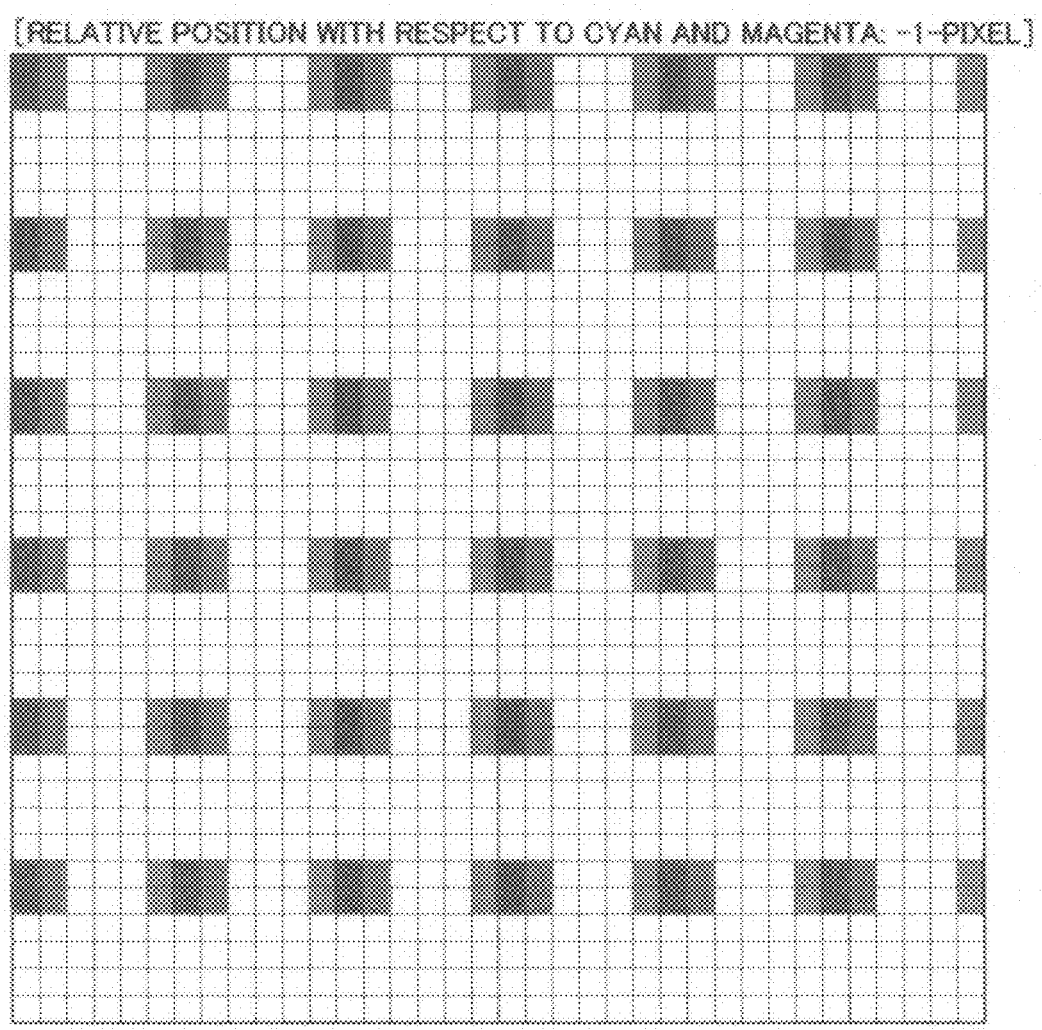
FIG. 32 shows a relative positional relation between the basic dither pattern (cyan) shown in FIG. 29 and the basic dither pattern (magenta) shown in FIG. 30 in a case where the two basic dither patterns are superposed with the basic dither pattern (magenta) displaced by one pixel in the negative direction.

With reference to FIG. 32, description will be given of a relative positional relation between the basic dither pattern (cyan) shown in FIG. 29 and the basic dither pattern (magenta) shown in FIG. 30 in a case where the two basic dither patterns are superposed with the basic dither pattern (magenta) displaced by one pixel in the negative direction (also referred to as a relative position of −1-pixel).

Figure 33:
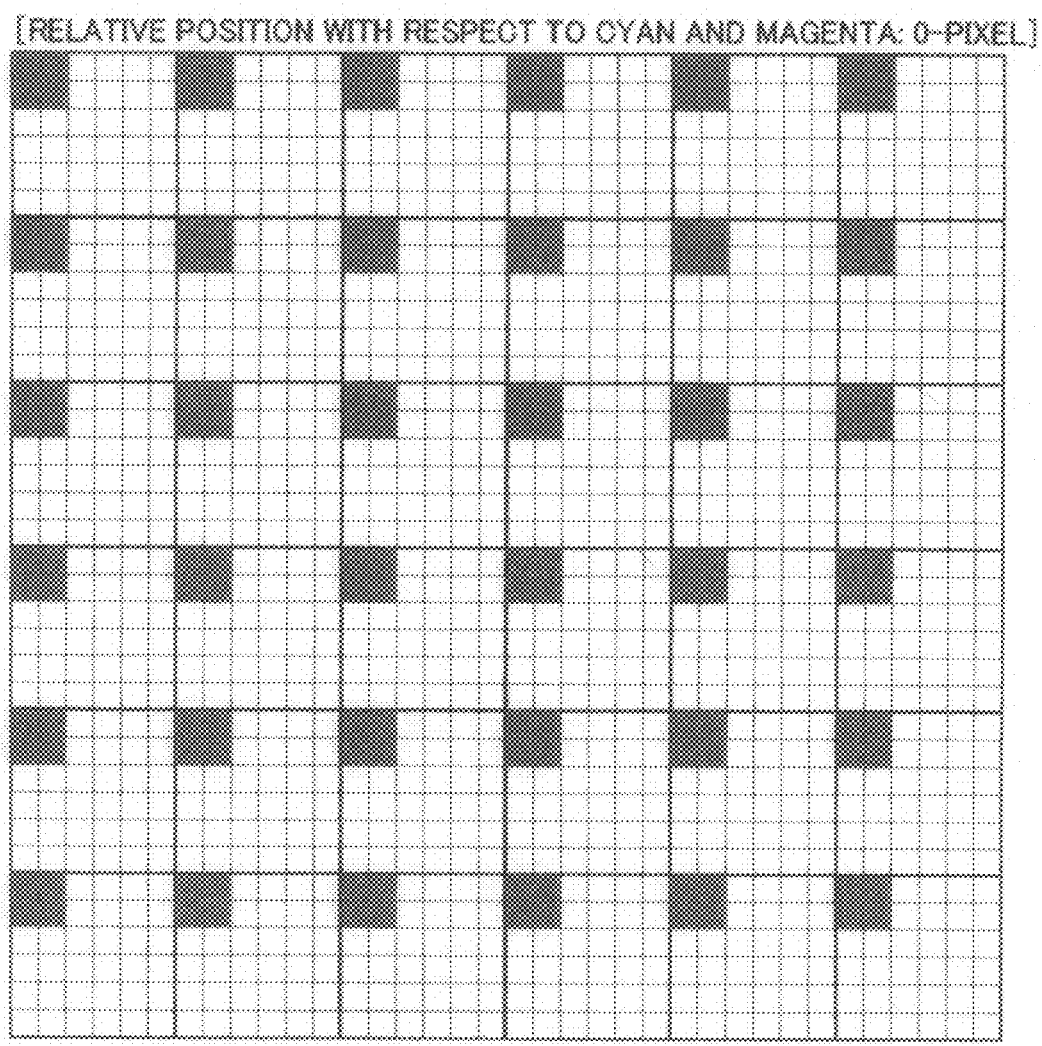
FIG. 33 shows a relative positional relation between the basic dither pattern (cyan) shown in FIG. 29 and the basic dither pattern (magenta) shown in FIG. 30 in a case where the two basic dither patterns are superposed without displacement.

With reference to FIG. 33, description will be given of a relative positional relation between the basic dither pattern (cyan) shown in FIG. 29 and the basic dither pattern (magenta) shown in FIG. 30 in a case where the two basic dither patterns are superposed without displacement (also referred to as a relative position of 0-pixel).

Figure 34:
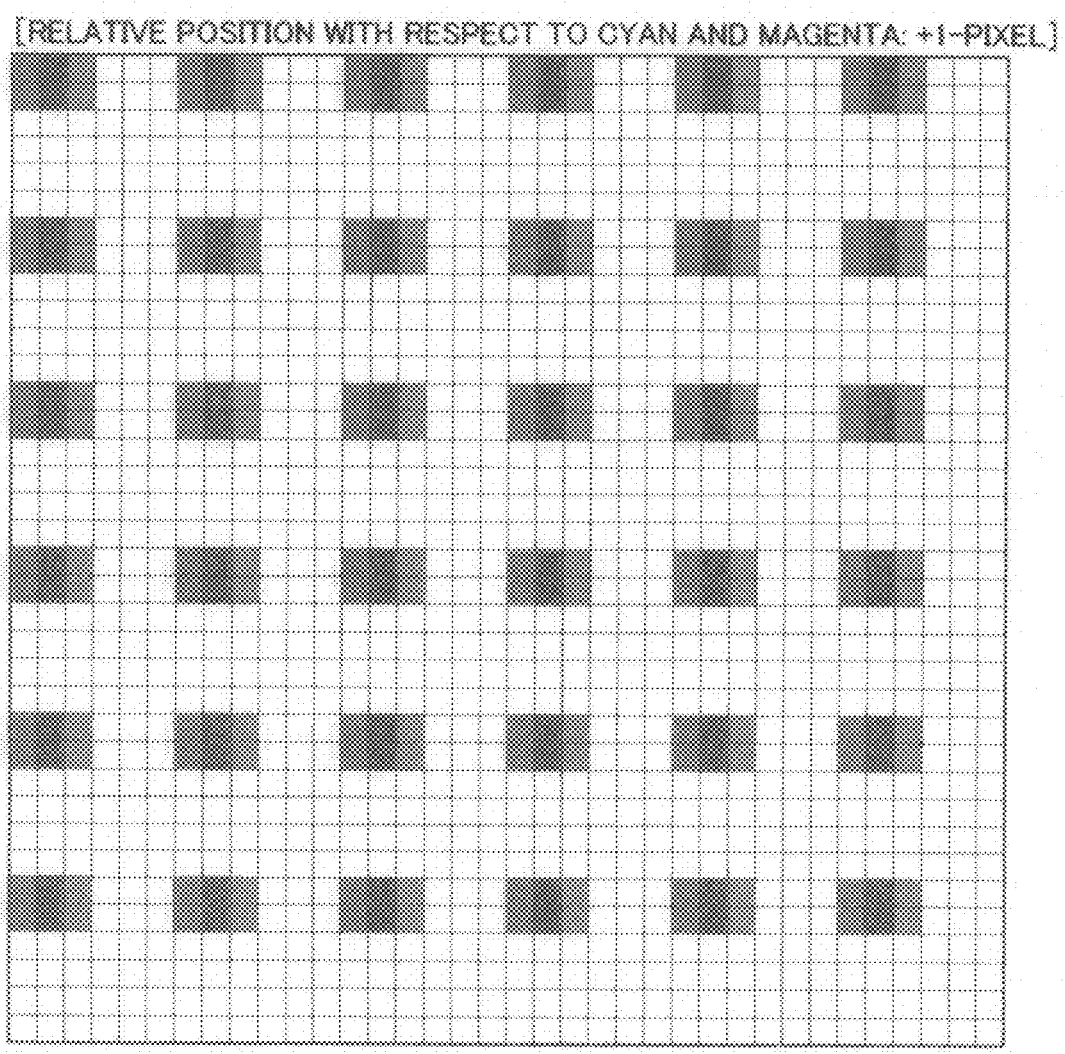
FIG. 34 shows a relative positional relation between the basic dither pattern (cyan) shown in FIG. 29 and the basic dither pattern (magenta) shown in FIG. 30 in a case where the two basic dither patterns are superposed with the basic dither pattern (magenta) displaced by one pixel in the positive direction.

With reference to FIG. 34, description will be given of a relative positional relation between the basic dither pattern (cyan) shown in FIG. 29 and the basic dither pattern (magenta) shown in FIG. 30 in a case where the two basic dither patterns are superposed with the basic dither pattern (magenta) displaced by one pixel in the positive direction (also referred to as a relative position of +1-pixel).

Figure 35:
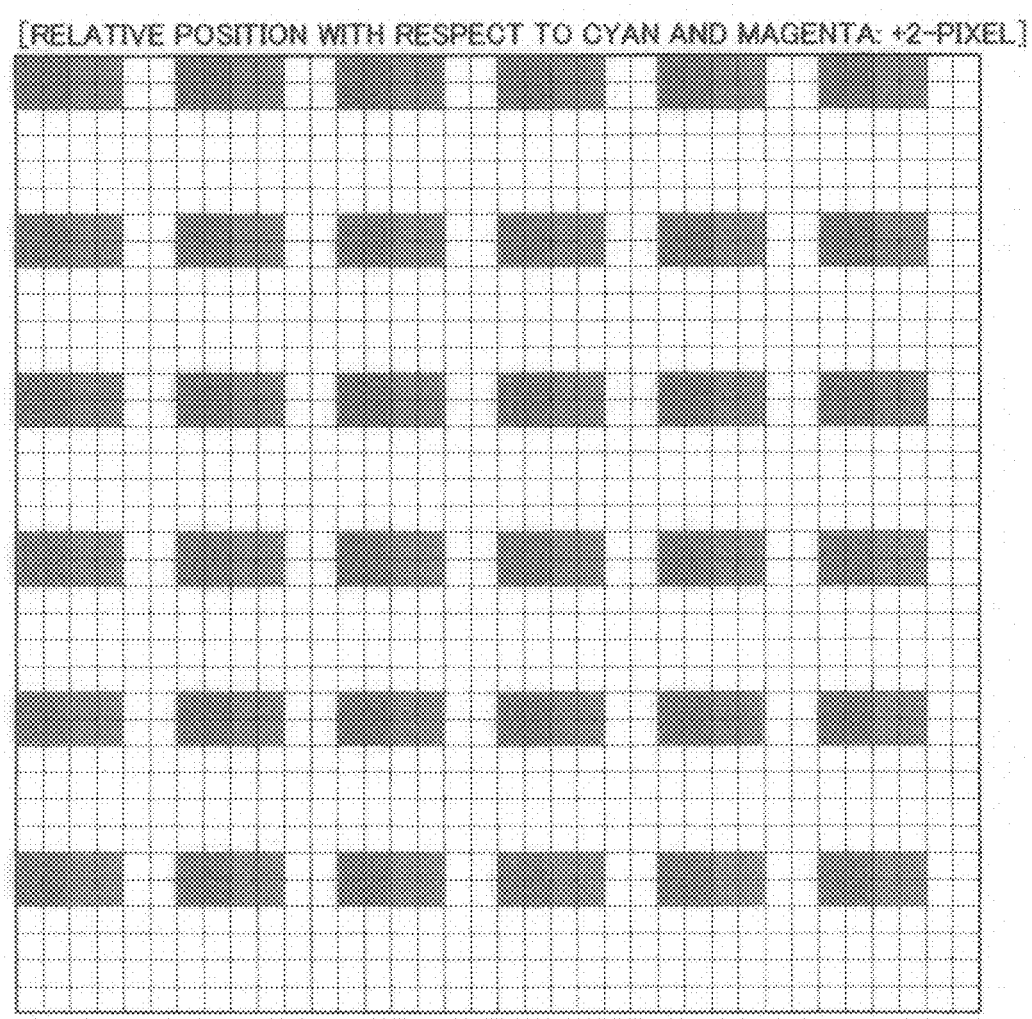
FIG. 35 shows a relative positional relation between the basic dither pattern (cyan) shown in FIG. 29 and the basic dither pattern (magenta) shown in FIG. 30 in a case where the two basic dither patterns are superposed with the basic dither pattern (magenta) displaced by two pixels in the positive direction.

With reference to FIG. 35, description will be given of a relative positional relation between the basic dither pattern (cyan) shown in FIG. 29 and the basic dither pattern (magenta) shown in FIG. 30 in a case where the two basic dither patterns are superposed with the basic dither pattern (magenta) displaced by two pixels in the positive direction (also referred to as a relative position of +2-pixel).

As described above, each halftone dot forming the basic dither pattern has the size of 2×2 pixels. As shown in FIGS. 31 to 35, when the basic dither pattern (magenta) is displaced, a position of a pixel (blue) generated by superposition of pixels (cyan and magenta) is also changed.

In the sixth specific example of the conventional basic dither pattern, as listed in Table 6 below, an area ratio of each color on a matrix basis varies largely in the relative positional relation. More specifically, such an area ratio may vary in the case where the basic dither pattern (magenta) is displaced by one pixel in the lateral direction.

TABLE 6

|  | −2-Pixel | −1-Pixel | 0-Pixel | +1-Pixel | +2-Pixel |
| --- | --- | --- | --- | --- | --- |
| Cyan | 11.1% | 5.6% | 0.0% | 5.6% | 11.1% |
| Magenta | 11.1% | 5.6% | 0.0% | 5.6% | 11.1% |
| Blue | 0.0% | 5.6% | 11.1% | 5.6% | 0.0% |
| White | 77.8% | 83.3% | 88.9% | 83.3% | 77.8% |

In the embodiment of the present invention, as one example, all the halftone dots in the basic dither pattern are equal in size to each other. However, the halftone dots are not necessarily equal in size to each other depending on a gradation to be represented.

Figure 36:
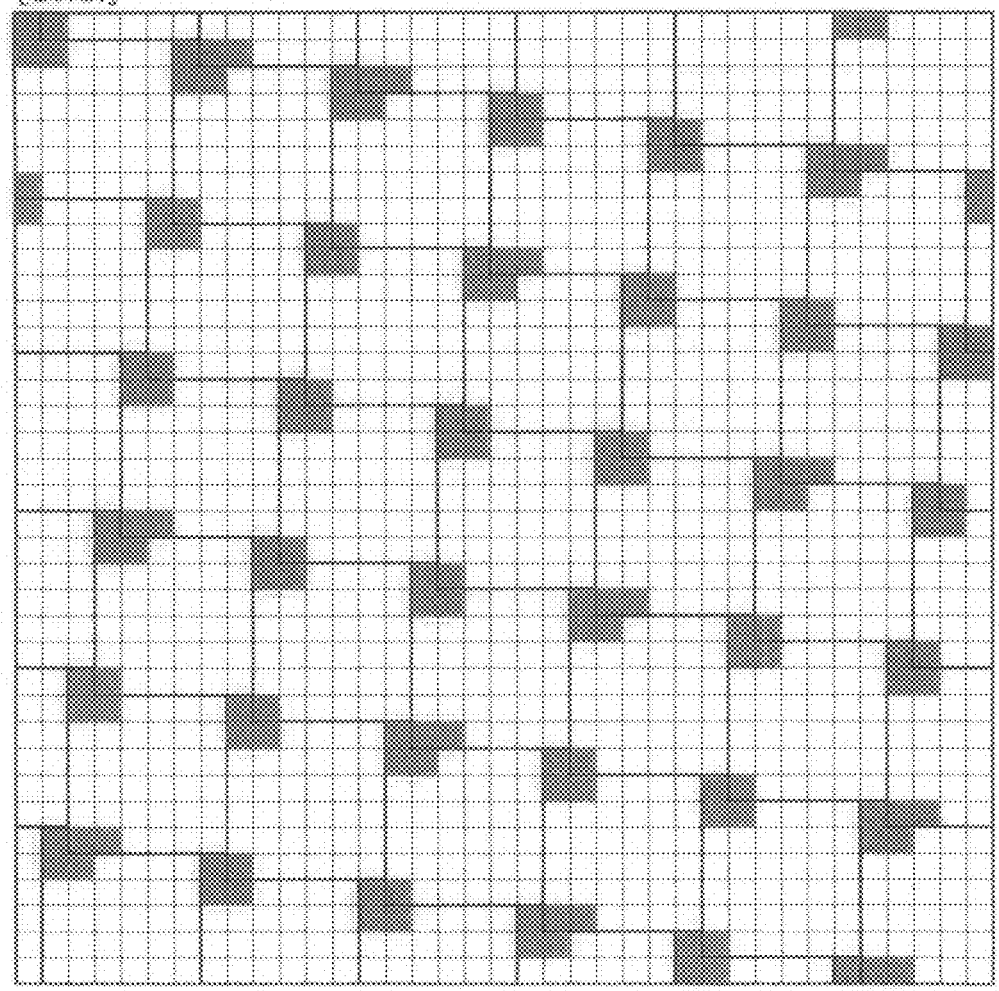
FIG. 36 shows a seventh specific example of the basic dither pattern (cyan) according to the embodiment of the present invention.

With reference to FIG. 36, description will be given of a seventh specific example of the basic dither pattern (cyan) according to the embodiment of the present invention.

Figure 37:
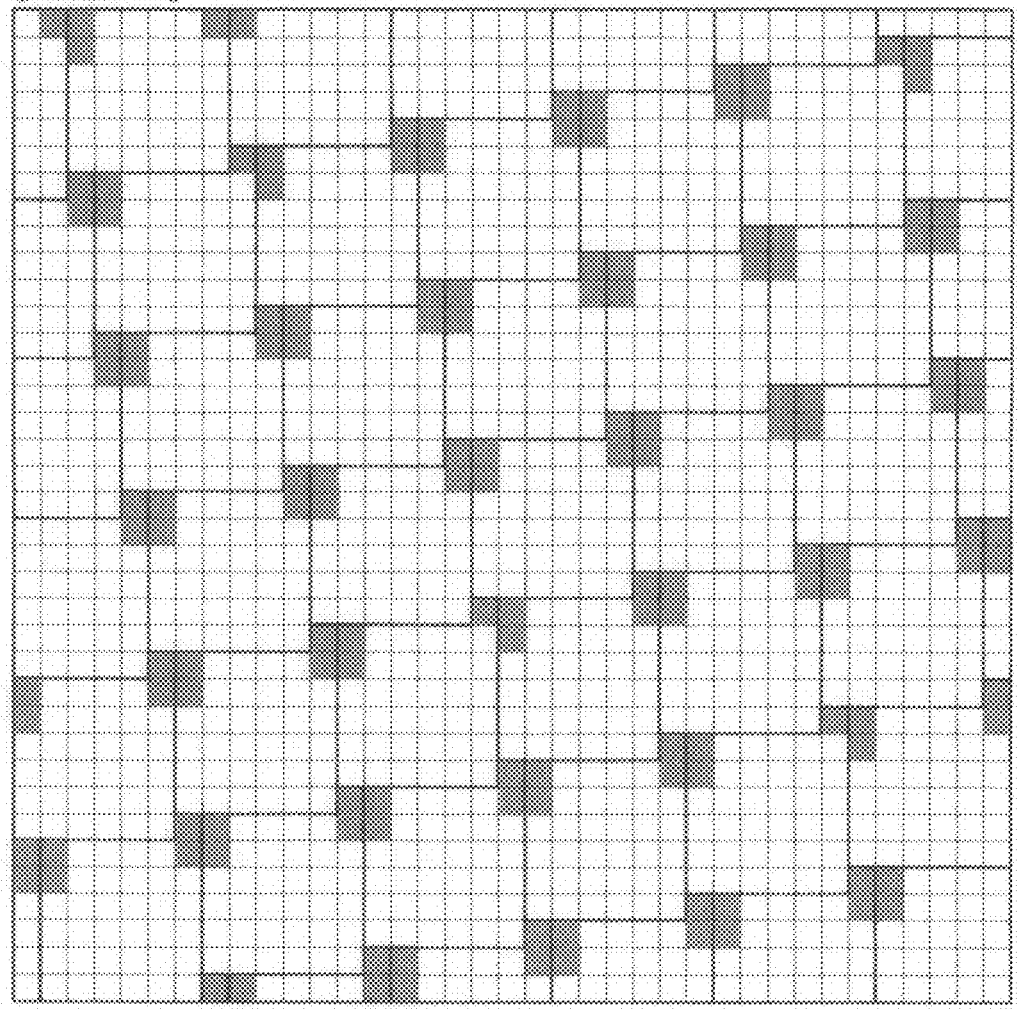
FIG. 37 shows a seventh specific example of the basic dither pattern (magenta) according to the embodiment of the present invention.

With reference to FIG. 37, description will be given of a seventh specific example of the basic dither patter (magenta) according to the embodiment of the present invention.

As shown in FIGS. 36 and 37, the basic dither pattern has a size of 37×37 pixels. Each halftone dot has a size of 2×2 pixels. However, some of the halftone dots have a different size. Herein, 37 halftone dots are arranged in the basic dither pattern.

Figure 38:
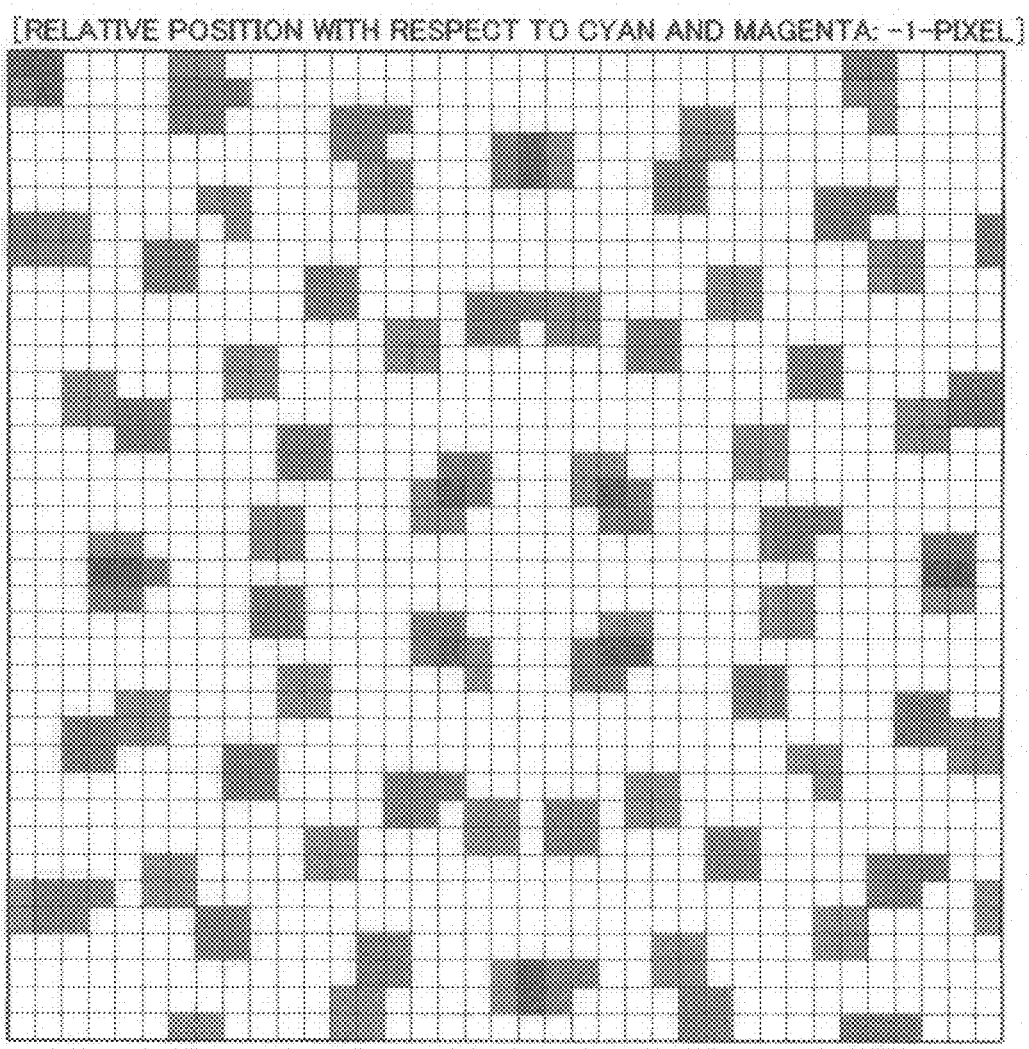
FIG. 38 shows a relative positional relation between the basic dither pattern (cyan) shown in FIG. 36 and the basic dither pattern (magenta) shown in FIG. 37 in a case where the two basic dither patterns are superposed with the basic dither pattern (magenta) displaced by one pixel in the negative direction.

With reference to FIG. 38, description will be given of a relative positional relation between the basic dither pattern (cyan) shown in FIG. 36 and the basic dither pattern (magenta) shown in FIG. 37 in a case where the two basic dither patterns are superposed with the basic dither pattern (magenta) displaced by one pixel in the negative direction (also referred to as a relative position of −1-pixel).

Figure 39:
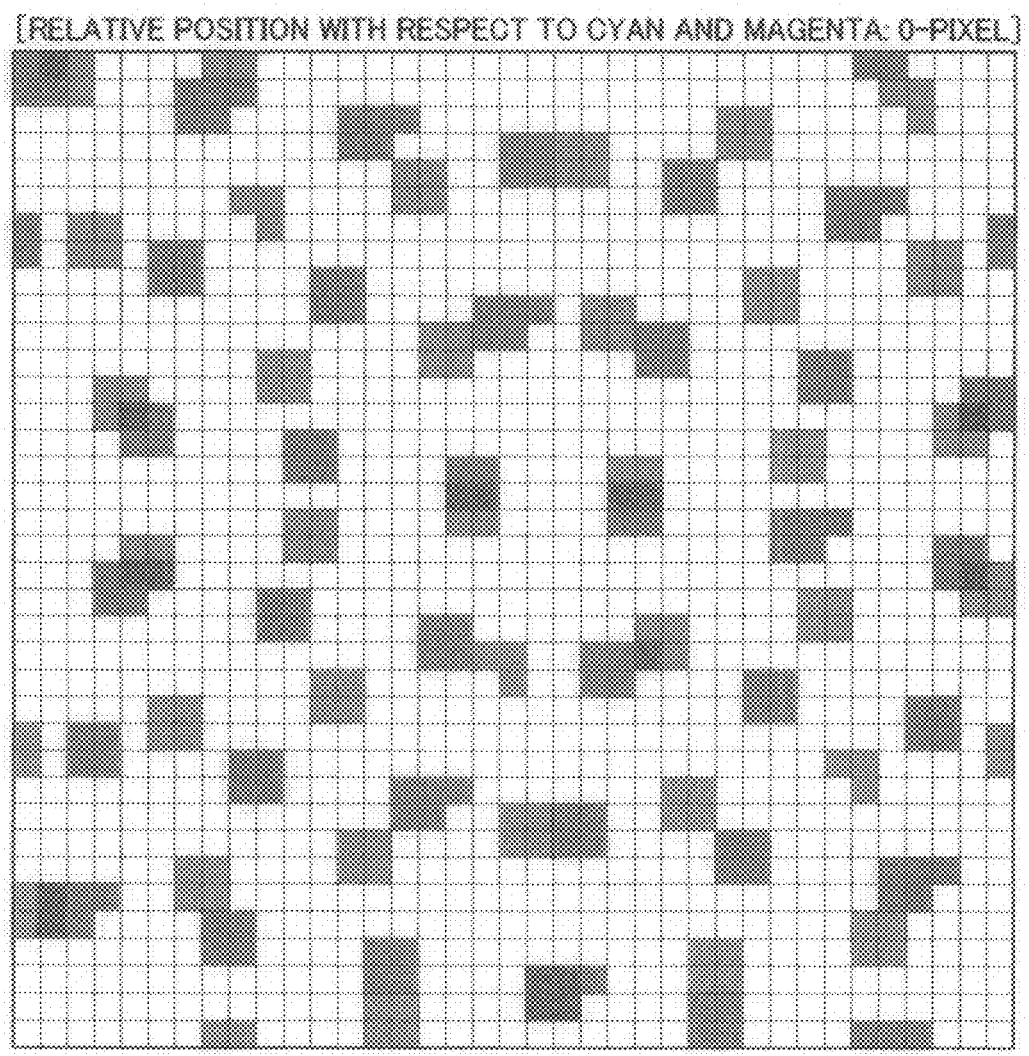
FIG. 39 shows a relative positional relation between the basic dither pattern (cyan) shown in FIG. 36 and the basic dither pattern (magenta) shown in FIG. 37 in a case where the two basic dither patterns are superposed without displacement.

With reference to FIG. 39, description will be given of a relative positional relation between the basic dither pattern (cyan) shown in FIG. 36 and the basic dither pattern (magenta) shown in FIG. 37 in a case where the two basic dither patterns are superposed without displacement (also referred to as a relative position of 0-pixel).

Figure 40:
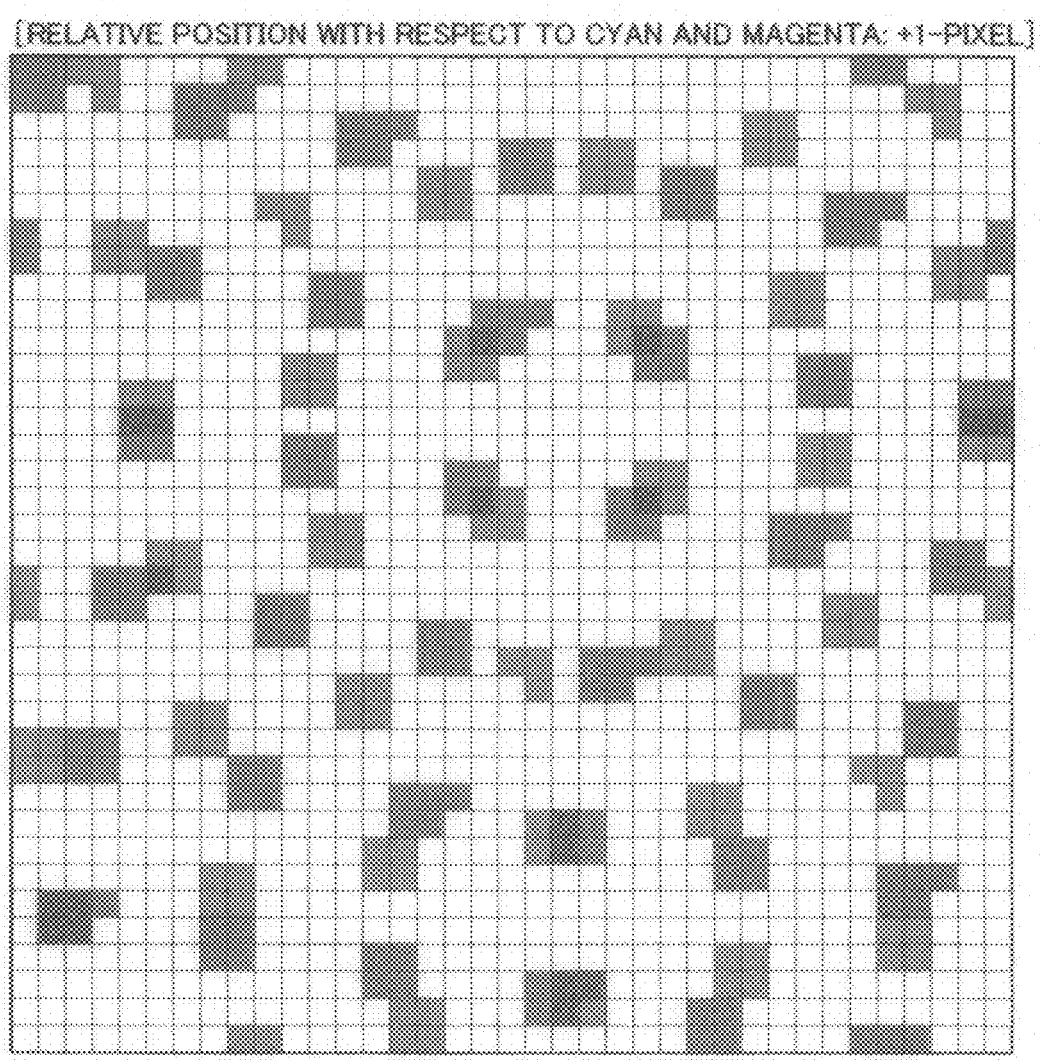
FIG. 40 shows a relative positional relation between the basic dither pattern (cyan) shown in FIG. 36 and the basic dither pattern (magenta) shown in FIG. 37 in a case where the two basic dither patterns are superposed with the basic dither pattern (magenta) displaced by one pixel in the positive direction.

With reference to FIG. 40, description will be given of a relative positional relation between the basic dither pattern (cyan) shown in FIG. 36 and the basic dither pattern (magenta) shown in FIG. 37 in a case where the two basic dither patterns are superposed with the basic dither pattern (magenta) displaced by one pixel in the positive direction (also referred to as a relative position of +1-pixel).

As described above, the halftone dots each forming the basic dither pattern have the different sizes. As shown in FIGS. 38 to 40, when the basic dither pattern (magenta) is displaced, a position of a pixel (blue) generated by superposition of pixels (cyan and magenta) is also changed.

In the seventh specific example of the basic dither pattern according to the embodiment of the present invention, as listed in Table 7 below, area ratios of respective colors on a 37×37-matrix basis are substantially equal to each other in the case where the basic dither pattern (magenta) is displaced by one pixel in the lateral direction.

TABLE 7

|  | −1-Pixel | 0-Pixel | +1-Pixel |
| --- | --- | --- | --- |
| Cyan | 10.5% | 10.4% | 10.4% |
| Magenta | 9.3% | 9.2% | 9.1% |
| Blue | 1.2% | 1.2% | 1.3% |
| White | 79.0% | 79.1% | 79.2% |

Figure 41:
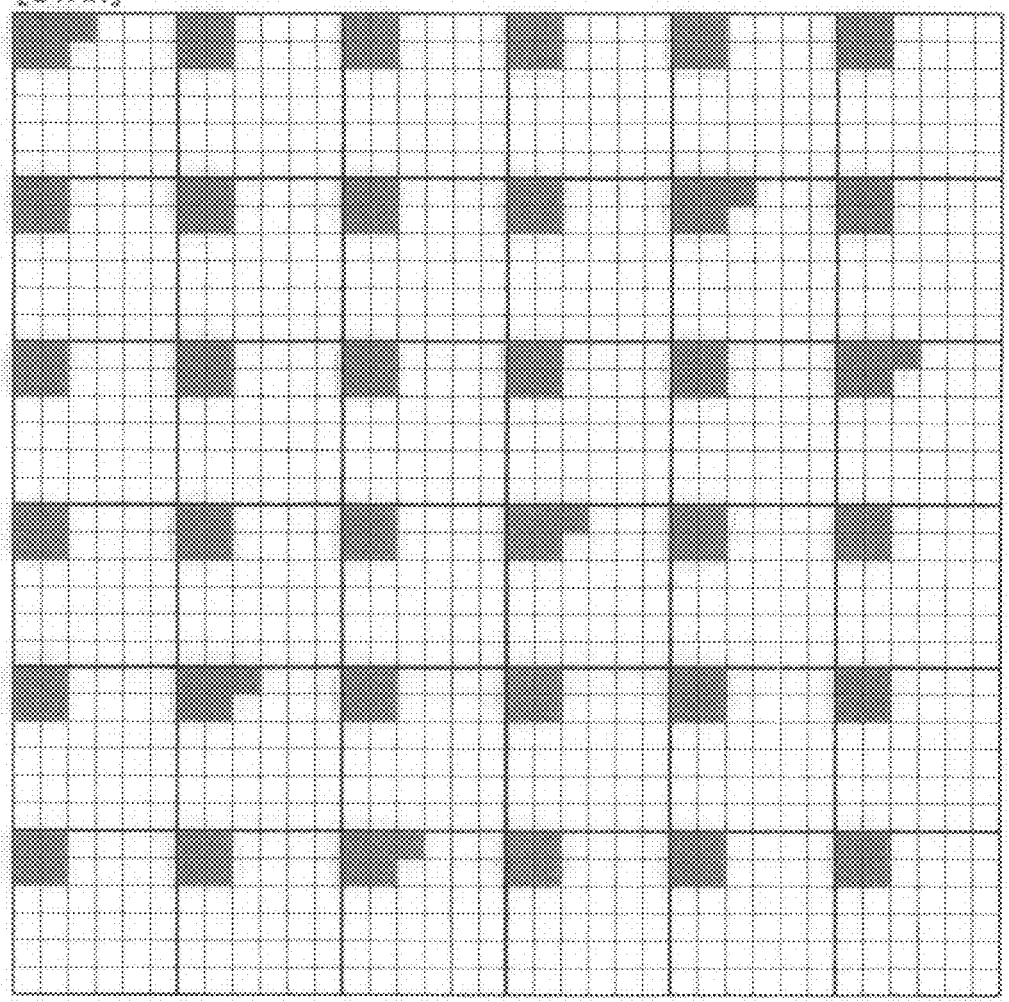
FIG. 41 shows an eighth specific example of the conventional basic dither pattern (cyan).

With reference to FIG. 41, description will be given of an eighth specific example of the conventional basic dither pattern (cyan).

Figure 42:
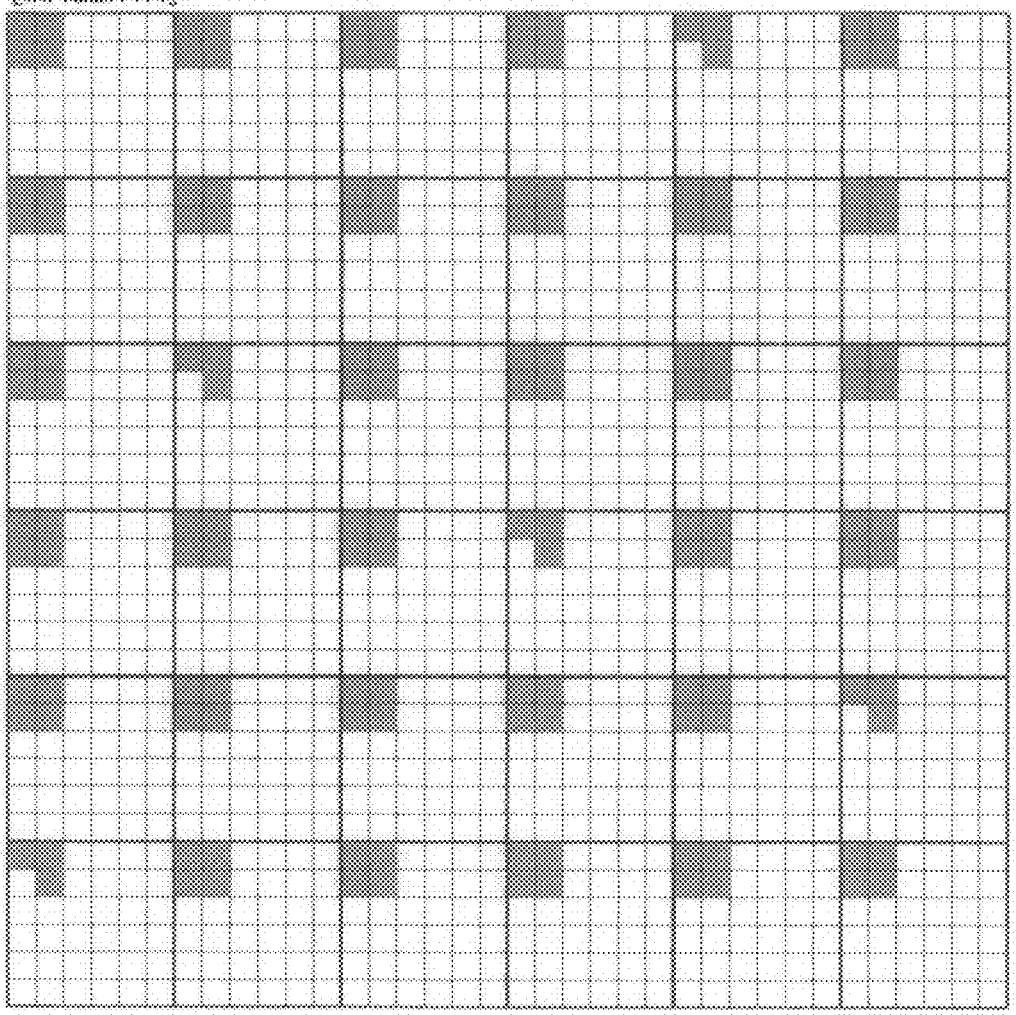
FIG. 42 shows an eighth specific example of the conventional basic dither pattern (magenta).

With reference to FIG. 42, description will be given of an eighth specific example of the conventional basic dither pattern (magenta).

As shown in FIGS. 41 and 42, the basic dither pattern has a size of 36×36 pixels. Each halftone dot has a size of 2×2 pixels. However, some of the halftone dots have a different size. Herein, 36 halftone dots are arranged in the basic dither pattern.

Figure 43:
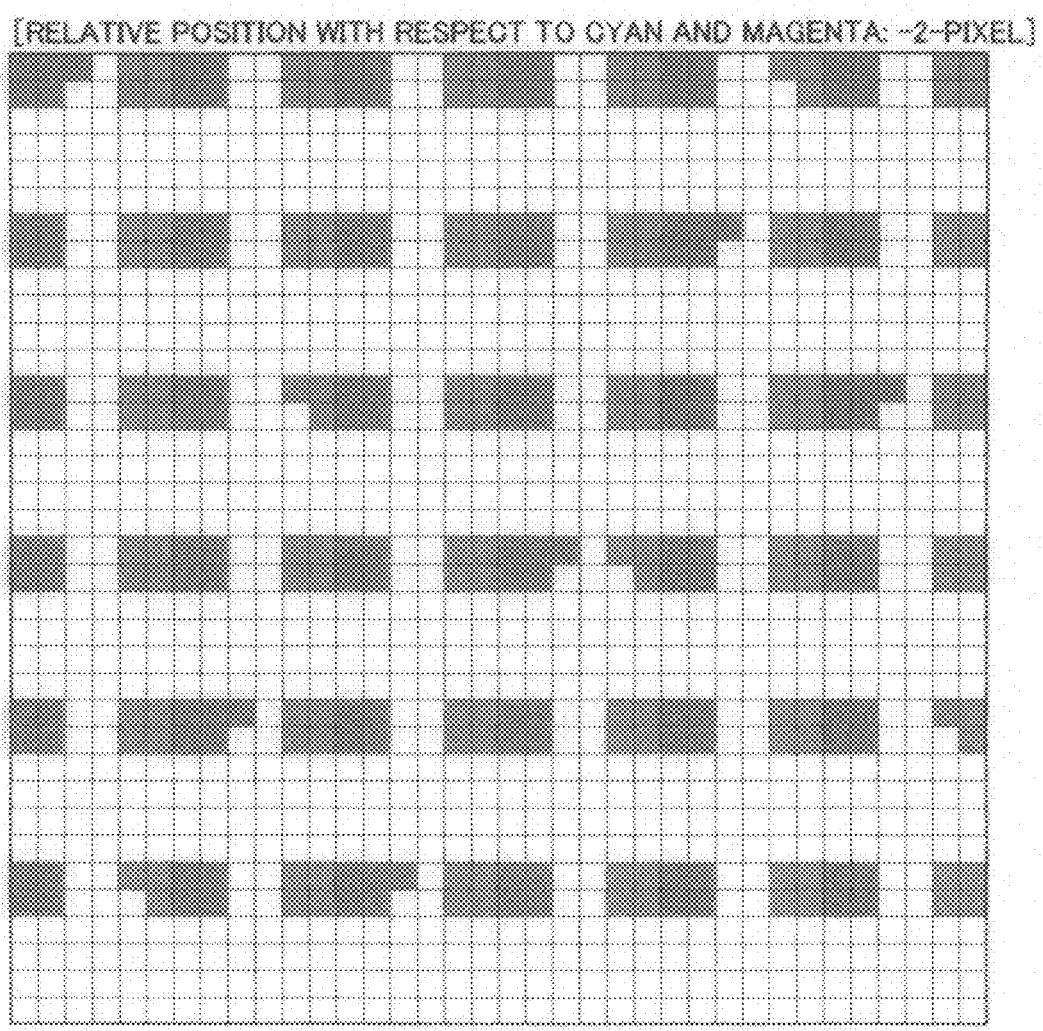
FIG. 43 shows a relative positional relation between the basic dither pattern (cyan) shown in FIG. 41 and the basic dither pattern (magenta) shown in FIG. 42 in a case where the two basic dither patterns are superposed with the basic dither pattern (magenta) displaced by two pixels in the negative direction.

With reference to FIG. 43, description will be given of a relative positional relation between the basic dither pattern (cyan) shown in FIG. 41 and the basic dither pattern (magenta) shown in FIG. 42 in a case where the two basic dither patterns are superposed with the basic dither pattern (magenta) displaced by two pixels in the negative direction (also referred to as a relative position of −2-pixel).

Figure 44:
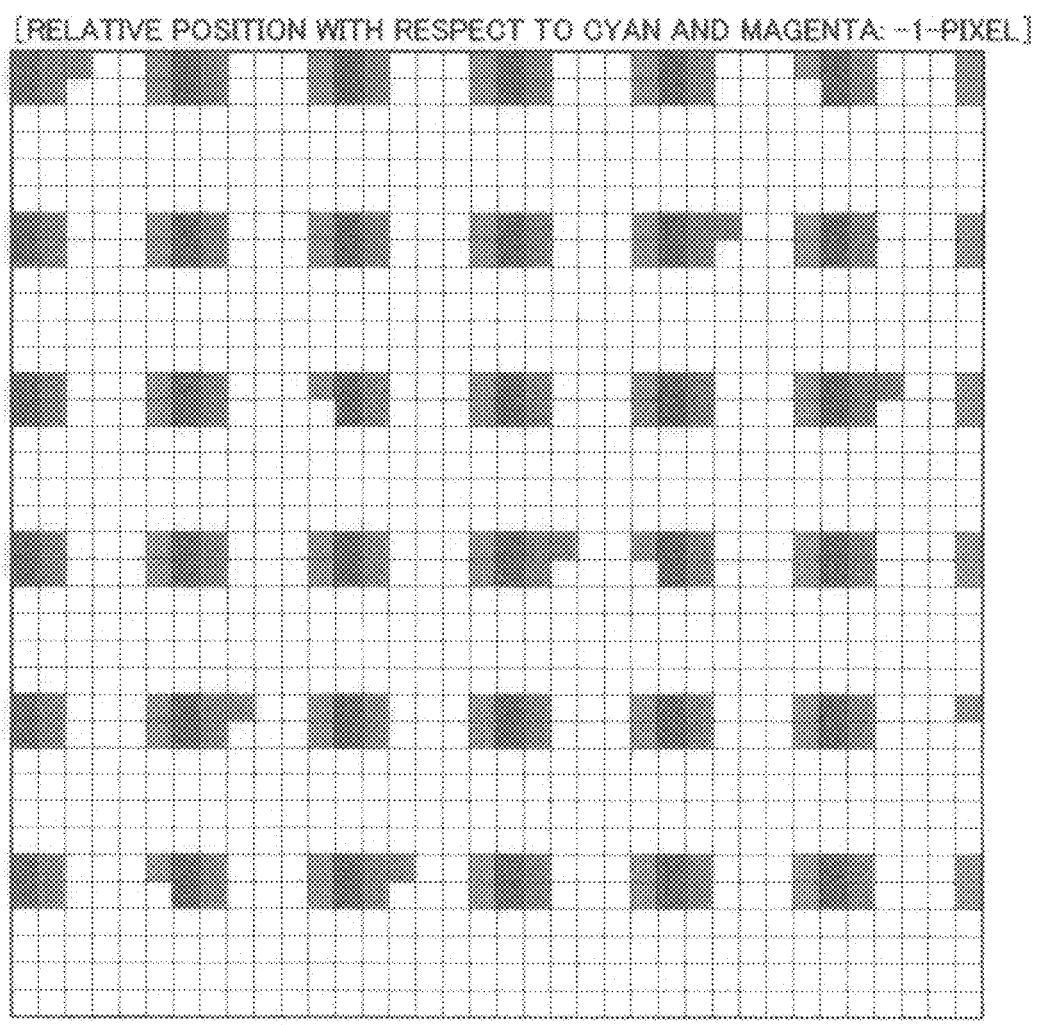
FIG. 44 shows a relative positional relation between the basic dither pattern (cyan) shown in FIG. 41 and the basic dither pattern (magenta) shown in FIG. 42 in a case where the two basic dither patterns are superposed with the basic dither pattern (magenta) displaced by one pixel in the negative direction.

With reference to FIG. 44, description will be given of a relative positional relation between the basic dither pattern (cyan) shown in FIG. 41 and the basic dither pattern (magenta) shown in FIG. 42 in a case where the two basic dither patterns are superposed with the basic dither pattern (magenta) displaced by one pixel in the negative direction (also referred to as a relative position of −1-pixel).

Figure 45:
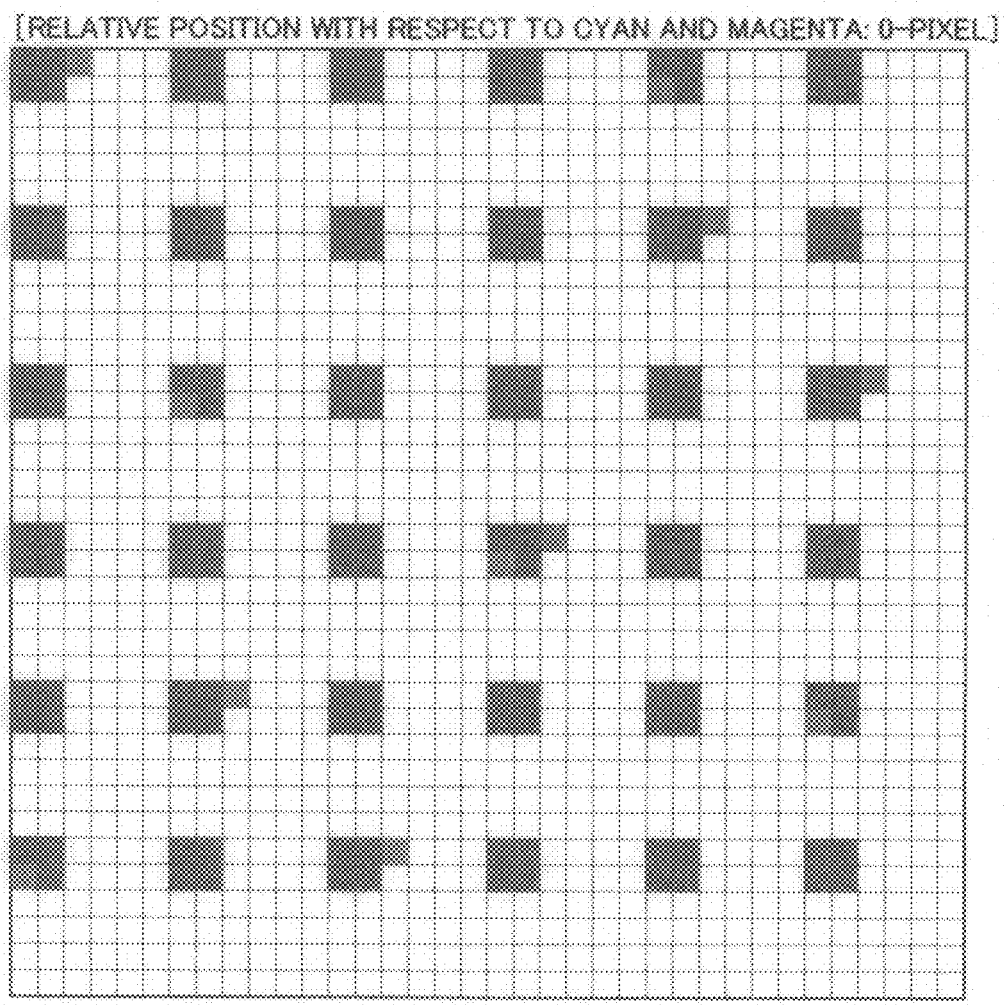
FIG. 45 shows a relative positional relation between the basic dither pattern (cyan) shown in FIG. 41 and the basic dither pattern (magenta) shown in FIG. 42 in a case where the two basic dither patterns are superposed without displacement.

With reference to FIG. 45, description will be given of a relative positional relation between the basic dither pattern (cyan) shown in FIG. 41 and the basic dither pattern (magenta) shown in FIG. 42 in a case where the two basic dither patterns are superposed without displacement (also referred to as a relative position of 0-pixel).

Figure 46:
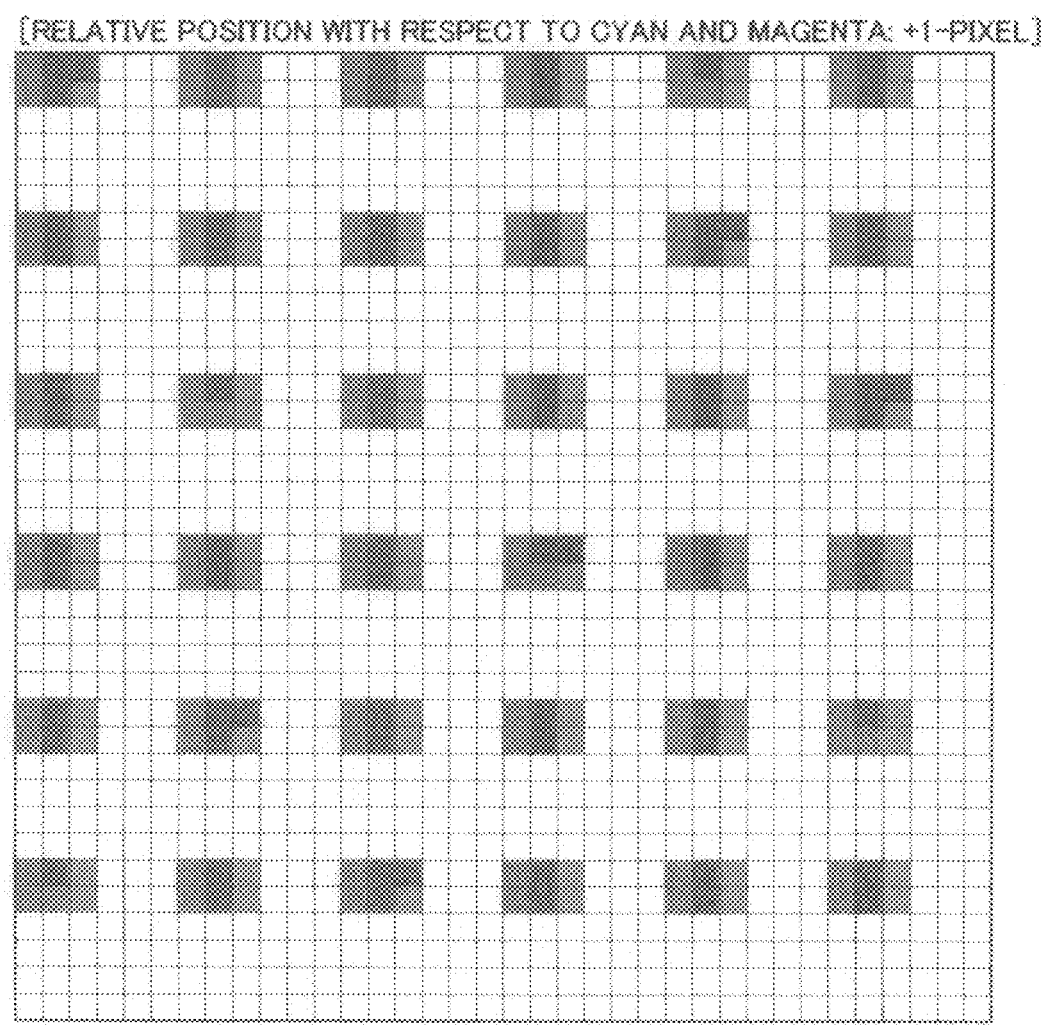
FIG. 46 shows a relative positional relation between the basic dither pattern (cyan) shown in FIG. 41 and the basic dither pattern (magenta) shown in FIG. 42 in a case where the two basic dither patterns are superposed with the basic dither pattern (magenta) displaced by one pixel in the positive direction.

With reference to FIG. 46, description will be given of a relative positional relation between the basic dither pattern (cyan) shown in FIG. 41 and the basic dither pattern (magenta) shown in FIG. 42 in a case where the two basic dither patterns are superposed with the basic dither pattern (magenta) displaced by one pixel in the positive direction (also referred to as a relative position of +1-pixel).

Figure 47:
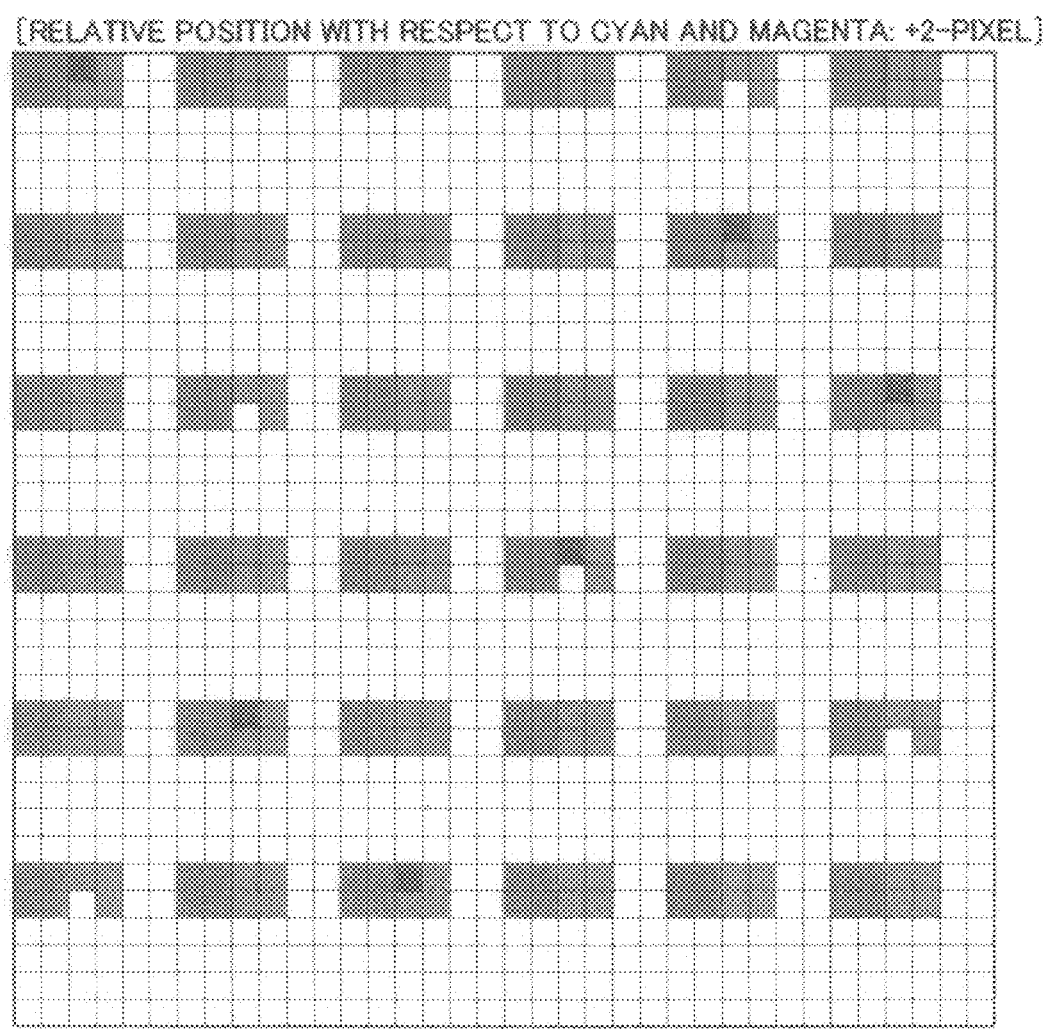
FIG. 47 shows a relative positional relation between the basic dither pattern (cyan) shown in FIG. 41 and the basic dither pattern (magenta) shown in FIG. 42 in a case where the two basic dither patterns are superposed with the basic dither pattern (magenta) displaced by two pixels in the positive direction.

With reference to FIG. 47, description will be given of a relative positional relation between the basic dither pattern (cyan) shown in FIG. 41 and the basic dither pattern (magenta) shown in FIG. 42 in a case where the two basic dither patterns are superposed with the basic dither pattern (magenta) displaced by two pixels in the positive direction (also referred to as a relative position of +2-pixel).

As described above, the halftone dots each forming the basic dither pattern have the different sizes. As shown in FIGS. 43 to 47, when the basic dither pattern (magenta) is displaced, a position of a pixel (blue) generated by superposition of pixels (cyan and magenta) is also changed.

In the eighth specific example of the conventional basic dither pattern, as listed in Table 8 below, an area ratio of each color on a matrix basis varies largely in the relative positional relation. More specifically, such an area ratio may vary in the case where the basic dither pattern (magenta) is displaced by one pixel in the lateral direction. That is, color variation may occur due to misregistration of colors.

TABLE 8

|  | −2-Pixel | −1-Pixel | 0-Pixel | +1-Pixel | +2-Pixel |
|---|---|---|---|---|---|
| Cyan | 11.6% | 6.0% | 0.8% | 5.9% | 11.1% |
| Magenta | 10.7% | 5.2% | 0.0% | 5.1% | 10.3% |
| Blue | 0.0% | 5.6% | 10.7% | 5.6% | 0.5% |
| White | 77.7% | 83.3% | 88.4% | 83.3% | 78.2% |

As listed in Table 8, in the basic dither pattern according to the present invention, slight color variation occurs due to misalignment of resist patterns in the case where the halftone dots in the matrix are different in size from each other. Unlike the conventional basic dither pattern, however, it is obvious that the degree of the color variation is minute.

Unlike the conventional basic dither pattern, the basic dither pattern according to the embodiment of the present invention can suppress the color variation even when misregistration of colors, that is, misalignment of resist patterns occurs.

Accordingly, the present invention allows suppression of a problem that color stability between pages or in a page deteriorates, to realize stable color reproduction. Moreover, the present invention allows maintenance of a stable gradation property by virtue of a sufficiently large matrix size.

In the foregoing embodiment, the color variation due to the misregistration of the colors (cyan and magenta) is suppressed. However, the present invention is not limited to the combination of the colors. According to the present invention, therefore, misregistration of colors other than the foregoing colors can be suppressed. In addition, the number of colors is not limited to two in the present invention. According to the present invention, alternatively, misregistration of a plurality of colors (e.g., not less than three colors) can be suppressed.

A program may be provided that allows a computer to perform the function of controller 601 as described above. Such a program may be recorded on a computer readable recording medium such as flexible disk, CD-ROM (Compact Disk-Read Only Memory), ROM (Read Only Memory), RAM (Random Access Memory) and memory card attached to a computer and be provided as a program product. Alternatively, the program recorded on a recording medium such as a hard disk installed in a computer may be provided. The program downloaded via a network may be provided.

It is noted that the program in accordance with the present invention may allow processing to be performed by invoking required program modules in a prescribed sequence and at a prescribed timing, among the program modules provided as a part of an operating system (OS) of a computer. In this case, the program itself does not include the aforementioned modules and processing is performed in cooperation with the OS. Such a program that does not include modules may also be included in the program in accordance with the present invention.

Furthermore, the program in accordance with the present invention may be incorporated in a part of another program. Also in this case, the program itself does not include the modules included in another program and the processing is performed in cooperation with another program. Such a program that is incorporated in another program may also be included in the program in accordance with the present invention.

The provided program product is installed in a program storage unit such as a hard disk for execution. It is noted that the program product includes the program itself and the recording medium having the program recorded thereon.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus for performing dither processing on image data to form an image subjected to pseudo-halftone processing, the image forming apparatus comprising:

a dither processing unit configured to perform dither processing on image data; and a dither pattern generation unit configured to generate a dither matrix for use in said dither processing, in accordance with an output gradation level, wherein said dither matrix has a size of M×N pixels, and has a plurality of halftone dots arranged in a predetermined pattern in accordance with said output gradation level in order to represent a gradation of each color, said plurality of halftone dots are arranged in said dither matrix such that the halftone dots corresponding to at least two colors are substantially identical in color area ratio to each other in said dither matrix irrespective of a relative position with respect to the colors; and said dither matrix includes basic patterns, and said basic patterns coming into contact with each other in a vertical direction are displaced mutually in a lateral direction.

2. The image forming apparatus according to claim 1, wherein each of the basic patterns has pixels equal in number to the pixels arranged in one side of said dither matrix.

3. The image forming apparatus according to claim 1, wherein the number of pixels arranged in one side of said dither matrix is an odd number.

4. The image forming apparatus according to claim 1, further comprising:
a density measurement unit configured to measure a density of an actual image formed by a printer engine;
a reference dither storage unit configured to store a referential dither matrix;
a pattern table storage unit configured to store a pattern table for specifying halftone dot arrangement in said referential dither matrix brought into correspondence with the output gradation level; and
a pattern table correction unit configured to correct the pattern table stored in said pattern table storage unit, on the basis of a result of the measurement by said density measurement unit, wherein
said dither pattern generation unit generates the dither matrix on the basis of an output result of the pattern table for specifying the halftone dot arrangement in said referential dither matrix from said pattern table correction unit in accordance with the output gradation level.

5. An image forming apparatus for performing dither processing on image data to form an image subjected to pseudo-halftone processing, the image forming apparatus comprising:
a dither processing unit configured to perform dither processing on image data; and
a dither pattern generation unit configured to generate a dither matrix for use in said dither processing, in accordance with an output gradation level,
wherein said dither matrix has a size of M×N pixels, and has a plurality of halftone dots arranged in a predetermined pattern in accordance with said output gradation level in order to represent a gradation of each color,
wherein said plurality of halftone dots are arranged in said dither matrix such that the halftone dots corresponding to at least two colors are substantially identical in color area ratio to each other in said dither matrix irrespective of a relative position with respect to the colors; and
wherein the M×N pixels are not less than four times as large in number as output gradations.

6. The image forming apparatus according to claim 5, wherein the number of pixels arranged in one side of said dither matrix is an odd number.

7. The image forming apparatus according to claim 5, further comprising:
a density measurement unit configured to measure a density of an actual image formed by a printer engine;
a reference dither storage unit configured to store a referential dither matrix;
a pattern table storage unit configured to store a pattern table for specifying halftone dot arrangement in said referential dither matrix brought into correspondence with the output gradation level; and
a pattern table correction unit configured to correct the pattern table stored in said pattern table storage unit, on the basis of a result of the measurement by said density measurement unit, wherein
said dither pattern generation unit generates the dither matrix on the basis of an output result of the pattern table for specifying the halftone dot arrangement in said referential dither matrix from said pattern table correction unit in accordance with the output gradation level.

8. An image forming method for performing dither processing on image data to form an image subjected to pseudo-halftone processing, the image forming method comprising the steps of:
performing dither processing on image data; and
generating a dither matrix for use in said dither processing in accordance with an output gradation level, wherein
said dither matrix has a size of M×N pixels, and has a plurality of halftone dots arranged in a predetermined pattern in accordance with said output gradation level in order to represent a gradation of each color, and said plurality of halftone dots are arranged in said dither matrix such that the halftone dots corresponding to at least two colors are substantially identical in color area ratio to each other in said dither matrix irrespective of a relative position with respect to the colors; and
said dither matrix includes basic patterns, and said basic patterns coming into contact with each other in a vertical direction are displaced mutually in a lateral direction.

9. The image forming method according to claim 8, wherein each of the basic patterns has pixels equal in number to the pixels arranged in one side of said dither matrix.

10. The image forming method according to claim 8, wherein
the number of pixels arranged in one side of said dither matrix is an odd number.

11. An image forming method for performing dither processing on image data to form an image subjected to pseudo-halftone processing, the image forming method comprising the steps of:
performing dither processing on image data; and
generating a dither matrix for use in said dither processing in accordance with an output gradation level,
wherein said dither matrix has a size of M×N pixels, and has a plurality of halftone dots arranged in a predetermined pattern in accordance with said output gradation level in order to represent a gradation of each color, and said plurality of halftone dots are arranged in said dither matrix such that the halftone dots corresponding to at least two colors are substantially identical in color area ratio to each other in said dither matrix irrespective of a relative position with respect to the colors; and
wherein the M×N pixels are not less than four times as large in number as output gradations.

12. The image forming method according to claim 11, wherein
the number of pixels arranged in one side of said dither matrix is an odd number.

13. A non-transitory computer-readable medium for storing a control program causing an image forming apparatus that performs dither processing on image data to form an image subjected to pseudo-halftone processing to execute the steps of:
performing dither processing on image data; and
generating a dither matrix for use in said dither processing in accordance with an output gradation level, wherein
said dither matrix has a size of M×N pixels, and has a plurality of halftone dots arranged in a predetermined pattern in accordance with said output gradation level in order to represent a gradation of each color, and said plurality of halftone dots are arranged in said dither matrix such that the halftone dots corresponding to at least two colors are substantially identical in color area ratio to each other in said dither matrix irrespective of a relative position with respect to the colors; and
said dither matrix includes basic patterns, and said basic patterns coming into contact with each other in a vertical direction are displaced mutually in a lateral direction.

14. The non-transitory computer-readable medium according to claim 13, wherein each of the basic patterns has pixels equal in number to the pixels arranged in one side of said dither matrix.

15. The non-transitory computer-readable medium according to claim 13, wherein
the number of pixels arranged in one side of said dither matrix is an odd number.

16. A non-transitory computer-readable medium for storing a control program causing an image forming apparatus that performs dither processing on image data to form an image subjected to pseudo-halftone processing to execute the steps of:
performing dither processing on image data; and
generating a dither matrix for use in said dither processing in accordance with an output gradation level,
wherein said dither matrix has a size of M×N pixels, and has a plurality of halftone dots arranged in a predetermined pattern in accordance with said output gradation level in order to represent a gradation of each color, and said plurality of halftone dots are arranged in said dither matrix such that the halftone dots corresponding to at least two colors are substantially identical in color area ratio to each other in said dither matrix irrespective of a relative position with respect to the colors, and
wherein the M×N pixels are not less than four times as large in number as output gradations.

17. The non-transitory computer-readable medium according to claim 16, wherein
the number of pixels arranged in one side of said dither matrix is an odd number.

\* \* \* \* \*